United States Patent
Gonnelli et al.

(10) Patent No.: US 9,833,383 B2
(45) Date of Patent: *Dec. 5, 2017

(54) FLUID TRANSFER DEVICE

(71) Applicant: Valeritas, Inc., Bridgewater, NJ (US)

(72) Inventors: Robert R. Gonnelli, Mahwah, NJ (US);
Robert L. Standley, Acton, MA (US);
Steven F. Levesque, North Pembroke, MA (US)

(73) Assignee: VALERITAS, INC., Bridgewater, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,985

(22) Filed: May 26, 2016

(65) Prior Publication Data

US 2016/0262983 A1    Sep. 15, 2016

Related U.S. Application Data

(63) Continuation of application No. 14/156,514, filed on Jan. 16, 2014, now Pat. No. 9,376,224, which is a
(Continued)

(51) Int. Cl.
*A61J 1/20* (2006.01)
*G01F 11/26* (2006.01)
*B65B 3/26* (2006.01)

(52) U.S. Cl.
CPC ............ *A61J 1/2089* (2013.01); *A61J 1/2096* (2013.01); *B65B 3/26* (2013.01); *G01F 11/262* (2013.01);
(Continued)

(58) Field of Classification Search
CPC .. B65B 3/26; A61J 1/22; G01F 11/262; G01F 11/26
(Continued)

(56) References Cited

U.S. PATENT DOCUMENTS 4,073,321 A   2/1978   Moskowitz
4,316,558 A   2/1982   Kubiak
(Continued)

FOREIGN PATENT DOCUMENTS

EP   3091310 A2   10/1983
EP   0937475 A2   8/1999
(Continued)

OTHER PUBLICATIONS

US 8,460,266, 06/2013, Okiyama (withdrawn)
(Continued)

*Primary Examiner* — Timothy L Maust
(74) *Attorney, Agent, or Firm* — Morgan, Lewis & Bockius LLP

(57) ABSTRACT

A fluid transfer device for transferring fluid between a supply reservoir and a fill reservoir includes a metering reservoir and a manifold that forms at least part of a first channel that is fluidly connected with the metering reservoir. The first channel comprises a first cannula extending from the manifold. The manifold forms at least part of a second channel fluidly connected with the metering reservoir. The second channel comprises a second cannula extending from the manifold. A third channel extends through the manifold and comprises a third cannula having a first end proximate a distal end of the first cannula and a second end proximate a distal end of the second cannula. A first check valve is disposed within the first channel and a second check valve is disposed within the second channel.

19 Claims, 19 Drawing Sheets

Related U.S. Application Data continuation of application No. 12/773,679, filed on May 4, 2010, now Pat. No. 8,667,996.

(60) Provisional application No. 61/175,329, filed on May 4, 2009.

(52) U.S. Cl.
CPC .............. *A61J 1/201* (2015.05); *A61J 1/2017* (2015.05); *A61J 1/2037* (2015.05); *A61J 1/2058* (2015.05); *A61J 1/2072* (2015.05); *Y10T 137/8593* (2015.04)

(58) Field of Classification Search
USPC .... 141/25–27, 319, 322, 329, 330; 604/407, 604/414
See application file for complete search history.

(56) References Cited

U.S. PATENT DOCUMENTS

| | | | |
|---|---|---|---|
| 4,357,971 A | 11/1982 | Friedman | |
| 4,432,755 A | 2/1984 | Pearson | |
| 4,640,048 A | 2/1987 | Winner | |
| 4,697,622 A | 10/1987 | Swift | |
| 4,902,278 A | 2/1990 | Maget et al. | |
| 5,074,844 A | 12/1991 | Zdeb | |
| 5,122,116 A | 6/1992 | Kriesel et al. | |
| 5,137,516 A | 8/1992 | Rand | |
| 5,238,031 A | 8/1993 | Baeumer | |
| 5,281,198 A | 1/1994 | Haber | |
| 5,329,976 A | 7/1994 | Haber | |
| 5,466,220 A | 11/1995 | Brenneman | |
| 5,562,616 A | 10/1996 | Haber | |
| 5,583,052 A | 12/1996 | Portnoff | |
| 5,637,099 A | 6/1997 | Durdin et al. | |
| 5,656,032 A | 8/1997 | Kriesel et al. | |
| 5,716,343 A | 2/1998 | Kriesel et al. | |
| 5,992,691 A | 11/1999 | Post et al. | |
| 6,021,824 A | 2/2000 | Larsen | |
| 6,068,613 A | 5/2000 | Kriesel et al. | |
| 6,164,348 A | 12/2000 | Rodwell | |
| 6,186,982 B1 | 2/2001 | Gross et al. | |
| 6,379,340 B1 | 4/2002 | Zinger | |
| 6,464,667 B1 | 10/2002 | Kamen | |
| 6,474,375 B2 | 11/2002 | Spero et al. | |
| 6,478,771 B1 | 11/2002 | Lavi | |
| 6,645,181 B1 | 11/2003 | Lavi | |
| 6,948,522 B2 | 9/2005 | Newbrough | |
| 7,086,431 B2 | 8/2006 | D'Antonio | |
| 7,337,922 B2 | 3/2008 | Rake et al. | |
| 7,418,981 B2 | 9/2008 | Baker et al. | |
| 7,481,792 B2 | 1/2009 | Gonnelli et al. | |
| 7,491,197 B2 | 2/2009 | Jansen et al. | |
| 7,530,968 B2 | 5/2009 | Gonnelli | |
| 7,678,079 B2 | 3/2010 | Shermer et al. | |
| 7,882,863 B2 | 2/2011 | Pestotnik | |
| 7,896,849 B2 | 3/2011 | Delay | |
| 8,529,502 B2 | 9/2013 | Radmer | |
| 9,376,224 B2 * | 6/2016 | Gonnelli | A61J 1/2089 |
| 2002/0123740 A1 | 9/2002 | Flaherty et al. | |
| 2003/0100863 A1 | 5/2003 | Shekalim | |
| 2004/0064097 A1 | 4/2004 | Peterson | |
| 2005/0033232 A1 | 2/2005 | Kriesel | |
| 2005/0215850 A1 | 9/2005 | Klein et al. | |
| 2006/0106346 A1 | 5/2006 | Sullivan et al. | |
| 2006/0264835 A1 | 11/2006 | Nielsen et al. | |
| 2008/0140007 A1 | 6/2008 | Glynn | |
| 2008/0166292 A1 | 7/2008 | Levin et al. | |
| 2009/0099547 A1 | 4/2009 | Rad mer | |
| 2009/0240232 A1 | 9/2009 | Gonnelli et al. | |

FOREIGN PATENT DOCUMENTS

| | | |
|---|---|---|
| FR | 2850015 A1 | 7/2004 |
| JP | 58-169452 | 10/1983 |
| JP | 59-500601 | 4/1984 |
| JP | 2003-033423 | 2/2003 |
| JP | 2004-524102 | 8/2004 |
| NL | 7310455 A | 2/1974 |
| RU | 2248223 C2 | 3/2005 |
| WO | 9948546 A | 9/1999 |
| WO | 2001049361 A1 | 7/2001 |
| WO | 2007022939 A1 | 3/2007 |
| WO | 2007122209 A1 | 11/2007 |
| WO | 2007147741 A1 | 12/2007 |
| WO | 2008053462 A2 | 5/2008 |
| WO | 2009144272 A1 | 12/2009 |
| WO | 20100015232 A1 | 2/2010 |

OTHER PUBLICATIONS

Second Office Action dated Oct. 18, 2016 for Chinese Patent Application No. 201410204112.9, 6 pages.
English Translation of First Office Action issued in connection with Chinese Application No. 200780020245.9.
International Search Report dated Jul. 6. 2010 in connection with International Application No. PCT/US2010/033590.
Written Opinion of the ISA dated Jul. 6. 2010 in connection with International Application No. PCT/US2010/033590.
Notice of Reasons for Rejection dated Jul. 4, 2017 for Japanese Patent Application No. 2016-169016, 7 pp.

* cited by examiner

FLUID TRANSFER DEVICE

CROSS-REFERENCE TO RELATED APPLICATIONS

This application is a continuation of U.S. application Ser. No. 14/156,514 filed Jan. 16, 2014 which is a continuation of U.S. application Ser. No. 12/773,679 filed May 4, 2010, now U.S. Pat. No. 8,667,996, which claims the benefit of U.S. Provisional Patent Application No. 61/175,329 filed May 4, 2009 entitled "Fluid Transfer Device and Method of Use", each of which is incorporated by reference herein in its entirety.

BACKGROUND OF THE INVENTION

The present invention generally relates to a fluid transfer device and, in at least one embodiment, relates to a fluid transfer device for transferring fluid from a sealed container such as a vial to a sealed fluid delivery device such as an ambulatory drug delivery device.

A wide range of injectable drug delivery devices are known in which a fluid medicament, such as insulin, is stored in an expandable-contractible reservoir. In such devices, the fluid is delivered to the patient from the reservoir by forcing the reservoir to contract. The term "injectable" is meant to encompass subcutaneous, intradermal, intravenous and intramuscular delivery.

Such devices can be filled by the manufacturer of the fluid delivery device or such devices can be filled by a pharmacist, a physician or a patient prior to use. If filled by the manufacturer, it may be difficult to provide the required drug stability in the device since the fluid may be stored from several weeks to a number of years and the fluid delivery device manufacturer must then be responsible for providing the required fluid. If filled by someone downstream, it is difficult for such a person to ensure that the fluid has completely filled the reservoir, i.e. that the reservoir and fluid path do not contain any undesirable air bubbles. In general, this requires priming the device by filling it in a certain orientation which ensures that the air is pushed ahead of the fluid, such as with the filling inlet at the bottom and the delivery outlet at the top (to allow the air to be displaced during filling). Also, transferring fluid from one container to another typically results in at least some wasted fluid.

It would therefore be desirable to provide an improved fluid transfer device for safely and efficiently transferring fluid between two containers.

BRIEF SUMMARY OF THE INVENTION

In one embodiment, a fluid transfer device, for transferring fluid between a supply reservoir and a fill reservoir, comprises a metering reservoir, a first flow path having a first one-way channel fluidly connected with the metering reservoir and configured to fluidly couple the supply reservoir and the metering reservoir and a second one-way channel fluidly connected with the metering reservoir and configured to fluidly couple the fill reservoir and the metering reservoir, and a second flow path configured to fluidly couple the supply reservoir and the fill reservoir. In one embodiment, the first one-way channel includes a first cannula and the second one-way channel includes a second cannula. In one embodiment, the first cannula includes a beveled tip. In one embodiment, the second cannula includes a beveled tip.

In a further embodiment, the fluid transfer device comprises a member supporting the first and second cannulas, the first cannula extending in a first direction from the member and the second cannula extending in a second direction from the member, the first direction being generally opposite the second direction. In one embodiment, the metering reservoir extends from the member generally in the first direction.

In a further embodiment, the fluid transfer device comprises a manifold that supports the first and second cannulas, the manifold forming at least part of the first one-way channel and at least part of the second one-way channel. In one embodiment, the first cannula has a larger cross sectional area than a cross sectional area of the second cannula.

In a further embodiment, the fluid transfer device comprises a supply support configured to couple the fluid transfer device with the supply reservoir. In one embodiment, the supply support includes at least one catch proximate the first channel and configured to releasably retain the supply reservoir. In one embodiment, the at least one catch includes at least two catches spaced different distances from the first channel. In one embodiment, the supply support includes at least one catch proximate the first channel and configured to non-releasably retain the supply reservoir. In one embodiment, the supply support is configured to position the first one-way channel within the supply reservoir and the first one-way channel is configured to transfer substantially all of the fluid from the supply reservoir.

In a further embodiment, the fluid transfer device comprises a member supporting the first and second one-way channels and a tray support connected to the member and configured to align the fill reservoir with the second one-way channel.

In a further embodiment, the fluid transfer device comprises a tray slideably connected to the tray support and configured to accommodate the fill reservoir. In one embodiment, at least one of the tray support and the tray further comprises a safety lock configured to prevent the tray from moving relative to the tray body when the tray is empty and exposing the second one-way channel. In a further embodiment, the fluid transfer device comprises a safety reservoir configured to removeably couple with the tray configured to block access to the second one-way channel in an initial position. In one embodiment, the first one-way channel includes a first cannula, the second one-way channel includes a second cannula and the second flow path includes a third cannula. In one embodiment, the third cannula is disposed within the first cannula and a first end of the third cannula is curved toward an inner side wall of the first cannula proximate a distal end of the first cannula. In one embodiment, a second end of the third cannula comprises a beveled tip. In one embodiment, the second and third cannula extend away from the metering reservoir, the second cannula extending further from the metering reservoir than the third cannula. In one embodiment, the metering reservoir includes a plunger. In one embodiment, the plunger comprises a plunger rod and a plunger tip. In one embodiment, the metering reservoir has a metering stop. In one embodiment, the metering stop is adjustable. In one embodiment, the volume of the metering reservoir is larger than the volume of the fill reservoir. In one embodiment, the volume of the supply reservoir is larger than the volume of the metering reservoir. In one embodiment, the second flow path extends partially within the first one-way channel. In one embodiment, a distal end of the first one-way channel and a first end of the second flow path are configured to sealingly engage with the supply reservoir and a distal end of the second one-way channel and a second end of the second flow path are each configured to sealingly engage with the fill reservoir. In one embodiment, the first and second one-way channels each comprise less than 200 µl of fluid transfer space. In one embodiment, a volume of the first one-way channel is less than a volume of the second one-way channel. In one embodiment, the fill reservoir comprises a fluid delivery device and the supply reservoir comprises a vial.

In another embodiment, a fluid transfer device comprises a metering reservoir, a manifold forming at least part of a first channel, the first channel fluidly connected with the metering reservoir, the first channel comprising a first cannula extending from the manifold, the manifold forming at least part of a second channel, the second channel fluidly connected with the metering reservoir, the second channel comprising a second cannula extending from the manifold, a third channel extending through the manifold and comprising a third cannula having a first end proximate a distal end of the first cannula and a second end proximate a distal end of the second cannula, a first check valve disposed within the first channel, and a second check valve disposed within the second channel. In one embodiment, the third cannula extends at least partially through the first cannula and the second cannula extends further from the manifold than the third cannula. In one embodiment, the first cannula is larger than the second cannula.

In another embodiment, a fluid transfer device comprises a metering reservoir, a first one-way channel fluidly connected with the metering reservoir, and a second one-way channel fluidly connected with the metering reservoir. In one embodiment, the first channel includes a first cannula and the second channel includes a second cannula. In one embodiment, the first cannula includes a first beveled tip. In one embodiment, the first cannula is configured to overcome the surface tension resistance of a fluid within a supply reservoir positioned below the first beveled tip. In one embodiment, the second cannula includes a second beveled tip. In a further embodiment, the fluid transfer device comprises a member supporting the first and second cannulas, the first cannula extending in a first direction from the member and the second cannula extending in a second direction from the member, the first direction being generally opposite the second direction. In one embodiment, the metering reservoir extends from the member generally in the first direction. In a further embodiment, the fluid transfer device comprises a manifold that supports the first and second cannulas, the manifold forming at least part of the first channel and at least part of the second channel.

In a further embodiment, the fluid transfer device comprises a member supporting the first and second channels, and a tray support connected to the member and configured to align a fill reservoir with the second channel. In a further embodiment, the fluid transfer device comprises a tray slideably connected to the tray support and configured to accommodate the fill reservoir. In one embodiment, at least one of the tray support and the tray further comprises a safety lock configured to prevent the tray from moving relative to the tray body when the tray is empty and exposing the second channel. In a further embodiment, the fluid transfer device comprises a safety reservoir configured to removeably couple with the tray and comprising a penetrable body configured to block access to the second channel in an initial position. In a further embodiment, the fluid transfer device comprises a third channel having a first end proximate a distal end of the first channel and a second end proximate a distal end of the second channel. In one embodiment, the distal end of the first channel and the first end of the third channel are configured to sealingly engage with a supply reservoir and the distal end of the second channel and the second end of the third channel are each configured to sealingly engage with a fill reservoir. In one embodiment, the third channel is partially within the first channel. In one embodiment, the third channel is at least partially generally coaxial with the first channel. In one embodiment, the first end of the third channel is curved toward an inner side wall of the first channel proximate the distal end of the first channel. In one embodiment, the first channel includes a first cannula, the second channel includes a second cannula and the third channel includes a third cannula. In one embodiment, the second end of the third cannula comprises a beveled tip. In one embodiment, the second and third cannula extend away from the metering reservoir, the second cannula extends further from the metering reservoir than the third cannula channel. In one embodiment, the metering reservoir has a volume that is greater than a volume of a fill reservoir configured to be fluidly engaged with the second one-way channel. In one embodiment, the fill reservoir comprises a fluid transfer delivery device.

In a further embodiment, the fluid delivery device comprises at least one first catch proximate the first channel and configured to releasably retain a supply reservoir. In a further embodiment, the fluid delivery device further comprises at least one second catch proximate the first channel, the at least one second catch spaced from the first channel further than the at least one first catch is spaced from the first channel. In one embodiment, the metering reservoir includes a plunger. In one embodiment, the plunger comprises a plunger rod and a plunger tip. In a further embodiment, the fluid delivery device comprises a supply support configured to accommodate a supply reservoir proximate the first channel. In one embodiment, the metering reservoir has an adjustable metering stop. In one embodiment, the first and second channels comprise less than 100 µl of fluid transfer space. In one embodiment, the first and second channels comprise less than 20 µl of fluid transfer space. In a further embodiment, the fluid delivery device comprises an upper support coupled to the first one-way channel, and a lower support coupled to the second one-way channel, the lower support being moveable with respect to upper support, wherein moving the lower support relative to the upper support changes the volume of the metering reservoir.

In another embodiment, a method of transferring fluid between a supply reservoir and a fill reservoir in a pharmacological system, comprises the steps of: fluidly coupling the supply reservoir with the fill reservoir via a sealed flow path; and creating a pressure differential between the supply reservoir and the fill reservoir to draw the fluid through the flow path and into the fill reservoir, wherein the overall volume of each of the fill and supply reservoirs remains constant during fluid transfer. In one embodiment, the flow path includes a metering reservoir. In one embodiment, the supply reservoir is fluidly connected to the metering reservoir via a first one-way channel and the metering reservoir is fluidly connected to the fill reservoir via a second one-way channel. In one embodiment, the method of transferring fluid between a supply reservoir and a fill reservoir in a pharmacological system, comprises the steps of: transferring a first volume of fluid from the supply reservoir into the fill reservoir; and transferring a second volume of fluid substantially equal to the first volume of fluid from the fill reservoir into the supply reservoir via a third channel. In one embodiment, the pressure differential is created using a manually operable pump, and the method further comprises the steps of: drawing the piston to expand the volume of the metering reservoir and draw the fluid from the fill reservoir through the first channel and into the metering reservoir; and depressing the piston to contract the volume of the metering reservoir to expel the fluid through the second channel and into the fill reservoir.

In another embodiment, a fluid transfer device comprises a metering reservoir having an adjustable volume, a manifold forming at least part of a first channel, the first channel fluidly connected with the metering reservoir, the first channel comprising a first cannula extending from the manifold, the manifold forming at least part of a second channel, the second channel fluidly connected with the metering reservoir, the second channel comprising a second cannula extending from the manifold, a third channel extending through the manifold and comprising a third cannula having a first end proximate a distal end of the first cannula and a second end proximate a distal end of the second cannula, a first check valve disposed within the first channel, and a second check valve disposed within the second channel. In one embodiment, the third cannula extends at least partially through the first cannula and second cannula extends further from the manifold than the third cannula.

BRIEF DESCRIPTION OF THE SEVERAL VIEWS OF THE DRAWINGS

The foregoing summary, as well as the following detailed description of embodiments of the fluid transfer device, will be better understood when read in conjunction with the appended drawings of exemplary embodiments. It should be understood, however, that the invention is not limited to the precise arrangements and instrumentalities shown.

In the drawings.

DETAILED DESCRIPTION OF THE INVENTION

Figure 1:
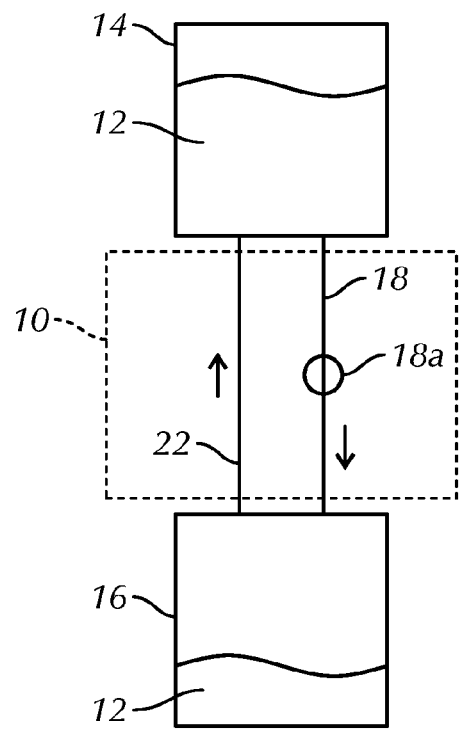
FIG. 1 is a schematic drawing of a system in accordance with an embodiment of the present invention.

Referring to the drawings in detail, wherein like reference numerals indicate like elements throughout, there is shown in FIGS. 1-23 a fluid transfer device, generally designated 10, in accordance with an exemplary embodiment of the present invention.

Figure 2:
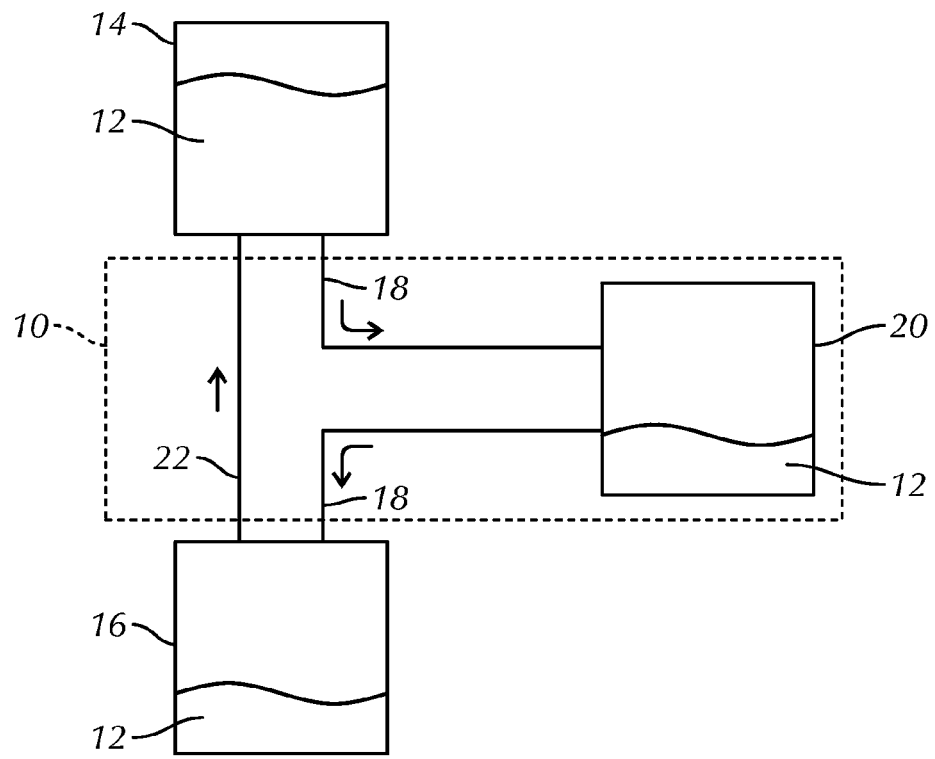
FIG. 2 is a schematic drawing of an alternative system in accordance with an embodiment of the present invention.
Figure 3:
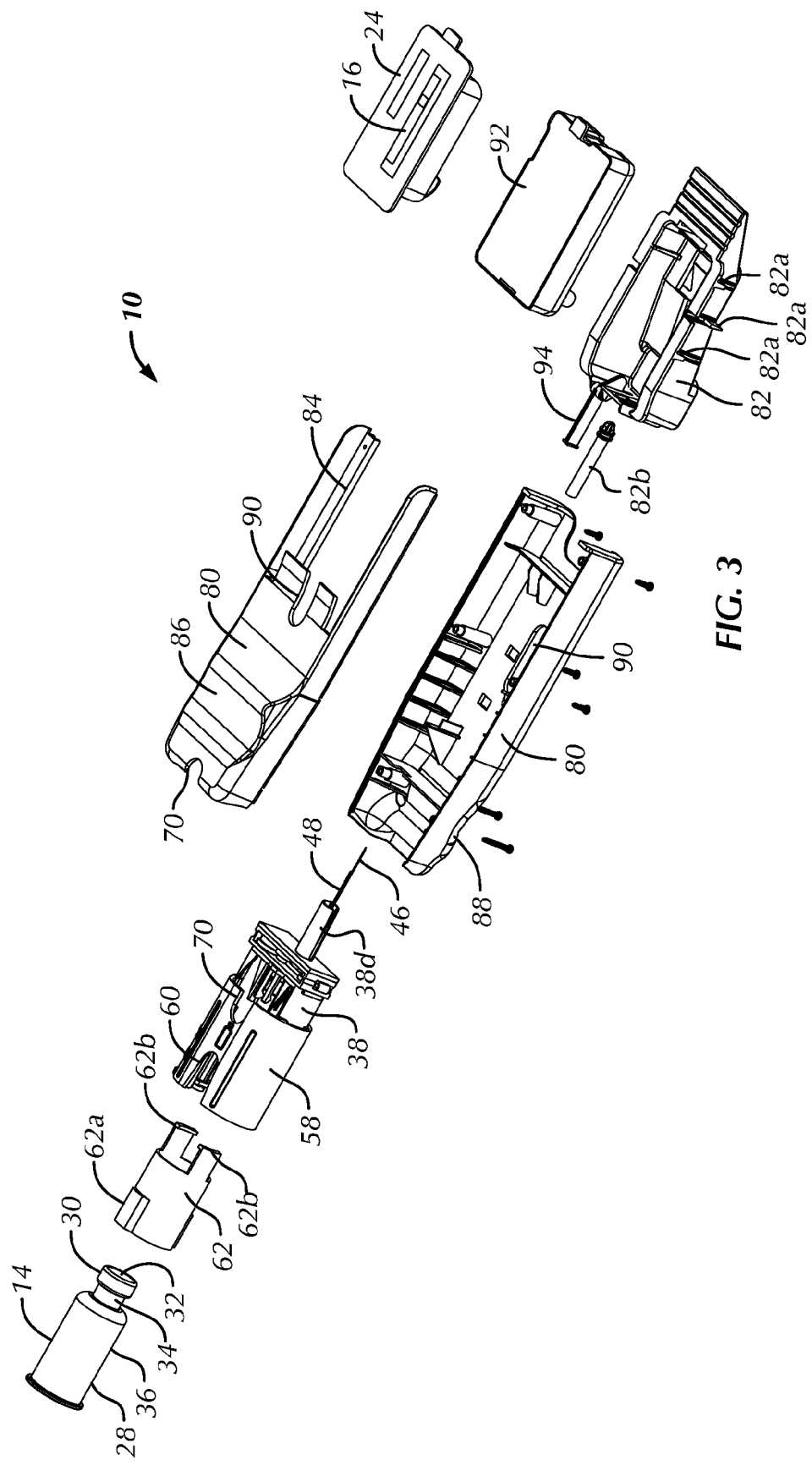
FIG. 3 is an exploded perspective view of a fluid transfer device in accordance with an exemplary embodiment of the present invention.

Referring to FIGS. 1, 2, and 3, in one embodiment, the fluid transfer device 10 forms part of a system that generally permits a fluid 12 from a supply reservoir 14 to be transferred to a fill reservoir 16. The supply reservoir 14 and the fill reservoir 16 may be any suitable containers for holding fluids. In one embodiment, the fluid transfer device 10 sealingly transfers fluid between two otherwise sealed containers having predetermined volumes. In one embodiment, the supply reservoir 14 is a drug vial 28. In one embodiment, the fill reservoir 16 is contained within an ambulatory fluid delivery device 24. In one embodiment, the fill reservoir 16 is a cartridge that is initially in a refracted position (i.e. filled with air). In one embodiment, the fluid transfer device 10 is used in a pharmacological system to transfer fluid containing an active pharmaceutical ingredient (API), such as insulin, from the supply reservoir 14, e.g. a drug vial 28, to a fill reservoir 16, e.g. a drug delivery device 24. The fluid 12 may be any fluid but in alternative embodiments the fluid 12 may include one or more of the following: GLP1 and analogs, glucagon, oxytocin, somatostatin, fentanyl, morphine, amiodarone, epinephrine, isoproterenol, esmolol, haloperidol, heparin, remicade, lidocaine, vasopressin, antibodies, human growth hormone, erythropoeitin, Avastin®, Tarceva®, follicle stimulating hormone, leutinizing hormone, human chorionic gonadotropin, corticosteroids, antibiotics, antivirals, antifungals or benzodiazepines.

In one embodiment, the supply reservoir 14 is fluidly coupled with the fill reservoir 16 via a first flow path 18. In one embodiment, the first flow path 18 is permitted to flow in only one direction. A change in pressure is initially created within the first flow path 18 to pull the fluid 12 from the supply reservoir 14 through the flow path 18 and into the fill reservoir 16. In one embodiment, the fill reservoir 16 is provided under positive or negative pressure with respect to atmospheric pressure prior to assembling the system such that fluidly connecting the supply and fill reservoirs 14, 16 causes or assists in the exchange of fluid 12. In one embodiment, the overall volumes of the supply and fill reservoirs 14, 16 remain constant during the fluid transfer. In one embodiment, the change in pressure is created via a pump 18a connected to or provided within the first flow path 18. In another embodiment, described further below, the change in pressure is created through the use of a metering reservoir 20 in connection with the first flow path 18.

In one embodiment, the fluid transfer device 10 forms a closed loop system with the supply reservoir 14 and the fill reservoir 16 such that fluid, either air or overflow liquid displaced from the fill reservoir 16, as described in further detail below, is transferred to the supply reservoir 14 and that the pressure in the supply and fill reservoirs 14, 16 equalizes or balances with each other through at least one of the first and second flow paths 18, 22. A first volume of the fluid 12 is transferred from the supply reservoir 14 into the otherwise sealed fill reservoir 16 and a second volume of the fluid 12 substantially equal to the first volume of the fluid 12 is transferred from the fill reservoir 16 into the otherwise sealed supply reservoir 14 via a second flow path 22. In one embodiment, the closed loop system of the fluid transfer device 10 does not include or introduce ambient air in the system other than any air that may exist within the first and second flow paths 18, 22 prior to fluidly connecting the supply and fill reservoirs 14, 16.

Such a closed loop system avoids introducing ambient air, which may contain contaminants, into the supply and fill reservoirs 14, 16. Avoiding contact with ambient air is important in certain pharmacological applications where the fluid 12 degrades when in contact with ambient air. The fluid transfer device 10 also reduces the distance the fluid 12 must travel from the supply reservoir 14 to the fill reservoir 16 by minimizing the volume of the first flow path 18. Minimizing the volume of the first flow path 18 reduces mixing the fluid 12 which may result in contaminations, degrading, agitating and/or foaming the fluid 12. Such a closed loop system also prevents wasting the fluid 12 as any overflow liquid 12 in the fill reservoir 16 is recycled back into the supply reservoir 14. The fluid transfer device 10 also reduces the number of steps and devices needed to transfer fluid 12 from one sealed container to another sealed container.

The fluid transfer device 10 further allows a user to fill the fill reservoir 16 from the supply reservoir 14 without having to measure the fluid 12. In one embodiment, the fluid transfer device 10 is configured for use with differently sized supply and metering reservoirs 14, 16 and in various combinations. In such a system, excess fluid 12 may be provided to ensure the fill reservoir 16 is full regardless of the size of the supply and metering reservoirs 14, 16 with any excess fluid 12 returning back into the supply reservoir 14. The fluid transfer device 10 may further allow an empty supply reservoir 14 to be exchanged with another supply reservoir 14 part-way through filling the fill reservoir 16. The fluid transfer device 10 may also allow a full fill reservoir 16 to be exchanged with an empty fill reservoir 16 part-way through emptying the supply reservoir 14. The fluid transfer device 10 may substantially empty the supply reservoir 14 such that the fluid 12 is not wasted when discarding the used supply reservoir 14. The fluid transfer device 10 may substantially reduce transferring air, ambient air and/or air contained within the system, into the fill reservoir 16.

Referring to FIG. 3, in one embodiment, the fill reservoir 16 comprises a fluid delivery device 24. The fluid delivery device 24 may be any known device having an internal cavity, i.e. the fill reservoir 16, to be filled with the fluid 12. In one embodiment, the fluid delivery device 24 administers the fluid 12 to a patient (not illustrated). Exemplary fluid delivery devices 24 for use with the fluid transfer device 10 include the devices disclosed in U.S. Pat. Nos. 6,939,324, 7,481,792 and 7,530,968, which are hereby incorporated by reference in their entirety. In one embodiment, the fill reservoir 16 includes a piercable closure, i.e. a septum, 16a and a plunger 16b at the other end to seal the fill reservoir 16 from ambient air and form an air tight cavity (see FIGS. 5, 20). In one embodiment, the fill reservoir 14 comprises a vial 28. In one embodiment, the vial 28 includes a closure 30, including a piercable member 32, such as a septum, on a neck 34. The neck 34 may have a reduced diameter and extends from a vial body 36. The cap 30, neck 34 and vial body 36 are shown to each have a circular cross-section; however, the vial 28 may take any shape such as square and be sealed from the ambient air in any suitable manner to form an air tight cavity.

Referring to FIGS. 3-8, in one embodiment, the fluid delivery device 10 includes a member or manifold 38. As described further below, the manifold 38 may be comprised of first, second and third sections 38a, 38b, 38c.

Figure 9:
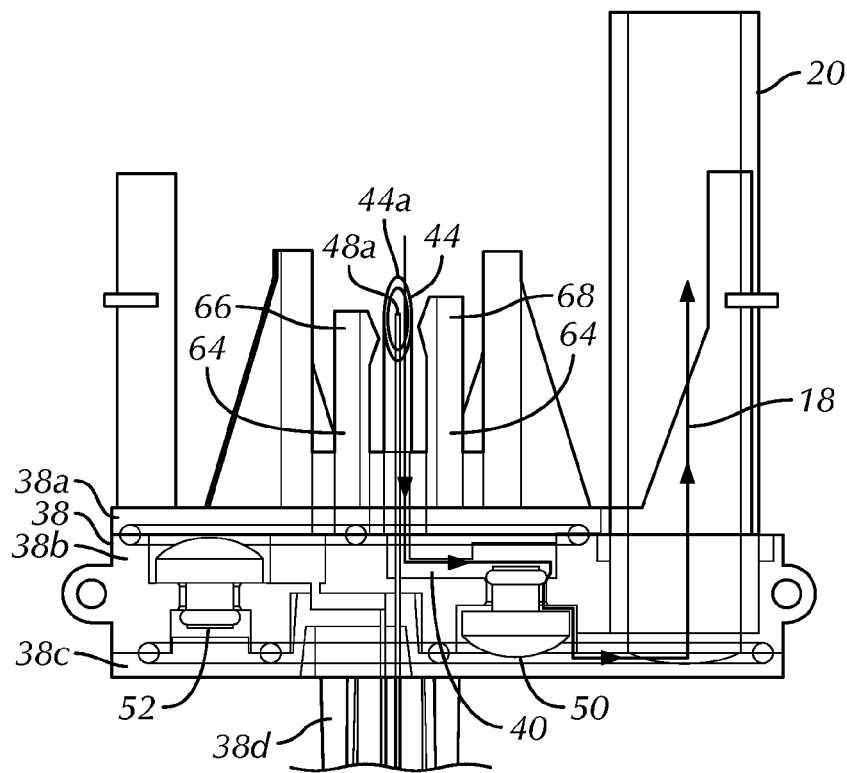
FIG. 9 is a partially transparent front view of the manifold shown in FIG. 4 illustrating a fluid flow direction through a first channel.
Figure 10:
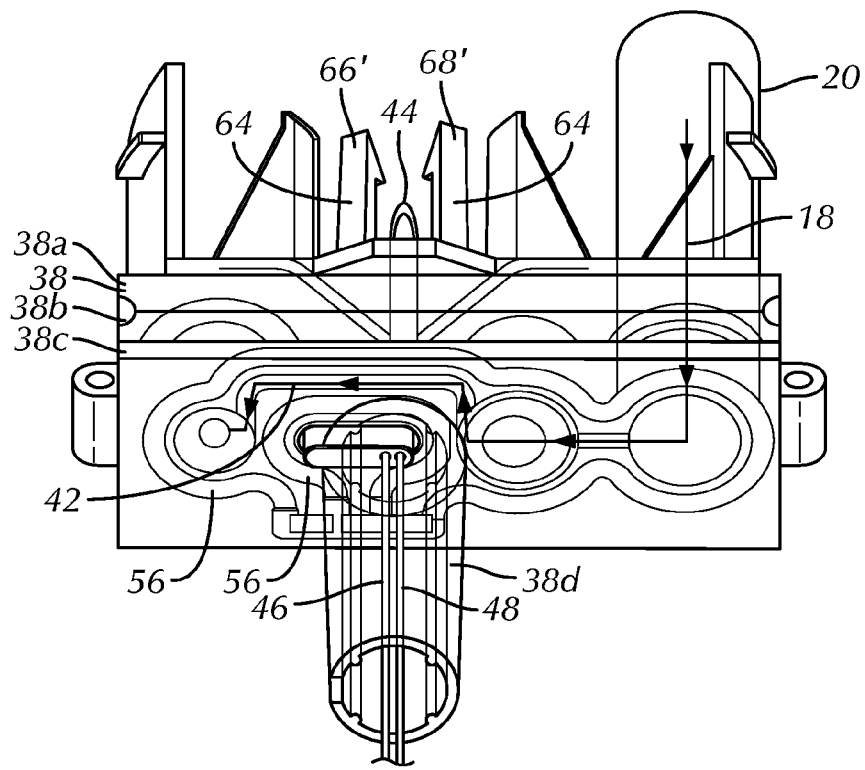
FIG. 10 is a partially transparent bottom perspective view of the manifold shown in FIG. 4 illustrating a fluid flow direction through the second channel.
Figure 11:
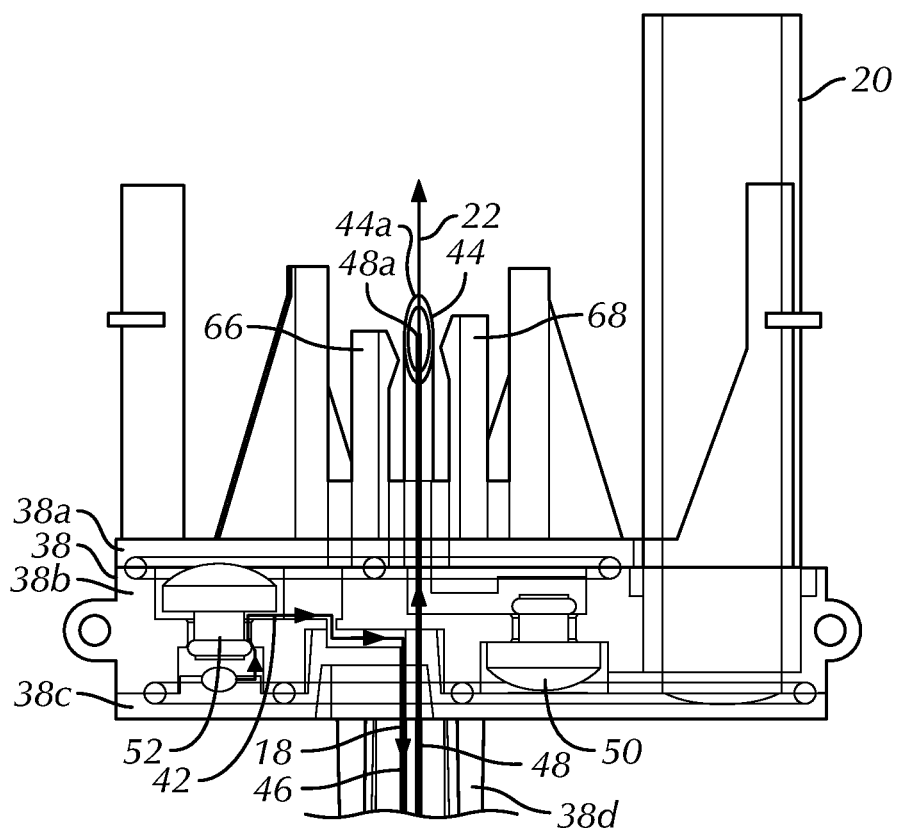
FIG. 11 is a partially transparent front view of the manifold shown in FIG. 3 illustrating a fluid flow direction through the second channel and a fluid flow direction through a third channel.

Referring to FIGS. 9-11, in one embodiment, the first fluid flow path 18 is comprised of first and second one-way channels 40, 42. In one embodiment, the first one-way channel (first channel) 40 fluidly connects the supply reservoir 14 with the metering reservoir 20. In one embodiment, the second one-way channel (second channel) 42 fluidly connects the metering reservoir 20 with the fill reservoir 16. In one embodiment, the first channel 40 has a volume less than a volume of the second channel 42. In one embodiment, having the volume of the first channel 40 being less than the volume of the second channel 42 prevents any air that is initially within the first channel 40 from being transferred to the fill reservoir 16 toward the end of delivery. The air that is initially within the first channel 40 may be transferred to the fill reservoir 16 upon filling of a subsequent fill reservoir 16 but the air will be transferred toward the beginning of the fill and will rise to the top of the fill reservoir and be transferred back into the supply reservoir 14 through the third cannula 48.

In one embodiment, the volumes of the first and second channels 40, 42 are minimized to reduce waste of fluid (e.g. fluid remaining in the first and second channels 40, 42 after the final use). In one embodiment, the first and second channels 40, 42 are configured such that the only fluid remaining in the first and second channels 40, 42 after the final use is approximately equal to the difference in volume between the first and second channels 40, 42. For example, because the only air within the system may be the air initially in the first and second channels 40, 42, the air initially within the first channel 40 is drawn into the metering chamber 20 and rises to the top of the metering chamber. Once the plunger 74 is depressed, the air initially within the second channel 42 is urged into the empty fill reservoir 16 displacing air back into the supply reservoir 14. Toward the end of the transfer, the air initially from the first channel 40 that is now in the metering reservoir 20 is urged into the second channel 42. If the volume of the second channel 42 is larger than the volume of the first channel, the air initially within the first channel 40 that is urged into the second channel 42 remains within the second channel 42 without entering the fill reservoir 16 and creating an air bubble trapped in the fill reservoir 16.

In one embodiment, the length of the first channel 40 is minimized to reduce the time it takes to transfer fluid from the supply reservoir 14 to the metering reservoir 20. In one embodiment, the cross sectional area of the first channel 40 is maximized as discussed above. In one embodiment, the volume of the first channel 40 is approximately 116 μl. In one embodiment, the volume of the second channel 42 is approximately 125 μl. In one embodiment, the first and second channels 40, 42 each comprise less than 600 μl of fluid transfer volume. In one embodiment, the first and second channels 40, 42 each comprise less than 500 μl of fluid transfer volume. In one embodiment, the first and second channels 40, 42 each comprise less than 400 μl of fluid transfer volume. In one embodiment, the first and second channels 40, 42 each comprise less than 300 μl of fluid transfer volume. In one embodiment, the first and second channels 40, 42 each comprise less than 200 μl of fluid transfer volume. In one embodiment, the first and second channels 40, 42 each comprise less than 100 μl of fluid transfer volume. In one embodiment, the first and second channels 40, 42 each comprise less than 90 μl of fluid transfer volume. In one embodiment, the first and second channels 40, 42 each comprise less than 80 μl of fluid transfer volume. In one embodiment, the first and second channels 40, 42 each comprise less than 70 μl of fluid transfer volume. In one embodiment, the first and second channels 40, 42 each comprise less than 60 μl of fluid transfer volume. In one embodiment, the first and second channels 40, 42 each comprise less than 50 μl of fluid transfer volume. In one embodiment, the first and second channels 40, 42 each comprise less than 40 μl of fluid transfer volume. In one embodiment, the first and second channels 40, 42 each comprise less than 30 μl of fluid transfer volume. In one embodiment, the first and second channels 40, 42 each comprise less than 20 μl of fluid transfer volume. In one embodiment, the first and second channels 40, 42 each comprise less than 10 μl of fluid transfer volume.

In one embodiment, the fluid transfer device 10, including first and second channels 40, 42, are configured to deliver a substantially non-agitating or non-turbulent fluid flow when transferring the fluid 12 from the supply reservoir 14 to the fill reservoir 16.

Figure 5:
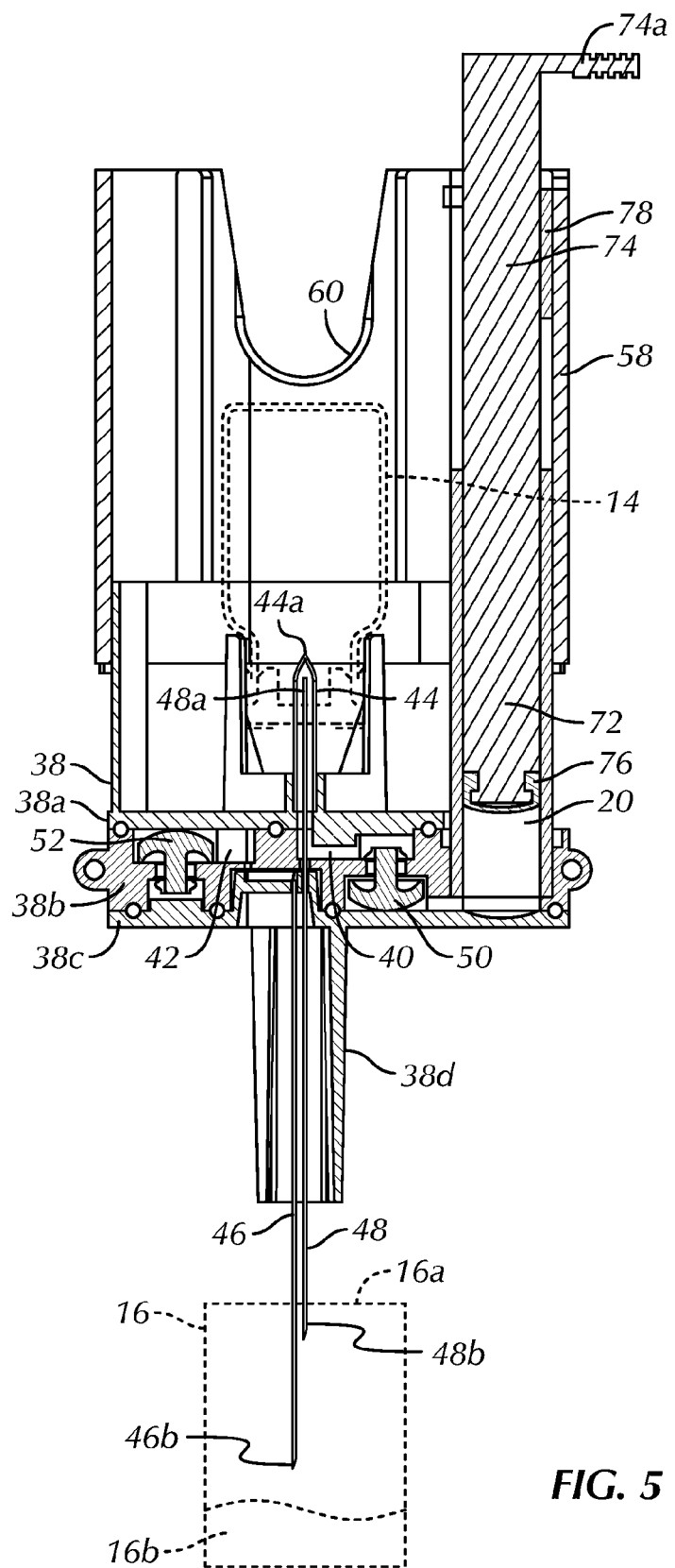
FIG. 5 is a cross-sectional view of the manifold and supply support shown in FIG. 4.

Referring to FIG. 5, in one embodiment, the distal end 44a of the first channel 40 and the first end 48a of the third channel 22 are configured to sealingly engage with a supply reservoir 14 and the distal end 46a of the second channel 42 and the second end 48b of the third channel 22 are each configured to sealingly engage with a fill reservoir 16. In one embodiment, the first channel 40 includes a first cannula 44 and the second channel 42 includes a second cannula 46. In one embodiment, the second fluid flow path or third channel 22 includes a third cannula 48. In one embodiment, the first channel 40 extends from the distal tip 44a of the first cannula 44 to the metering reservoir 20. In one embodiment, the second channel 42 extends from the metering reservoir 20 to the distal tip 46a of the second cannula 46. In one embodiment, the manifold 38 rigidly supports the first, second and third cannulas 44, 46, 48. The first cannula 44 extends from the first section 38a of the manifold 38 in a first direction and the second cannula 46 extends from the third section 38c of the manifold 38 in a second direction. In one embodiment, the first direction is generally opposite the second direction. In another embodiment, the metering reservoir 20 extends from the manifold 38 generally in the first direction. In one embodiment, the third cannula 48 extends through the manifold 38 and has a first end 48a proximate a distal tip 44a of the first cannula 44 and a second end 48b proximate a distal tip 46b of the second cannula 46. In one embodiment, the second cannula 46 extends from the manifold 38 further than the third cannula 48 extends from the manifold 38. In such an embodiment as shown and when used in a generally vertical manner with the supply reservoir 14 above the fill reservoir 16, the orientation of the supply, transfer and fill reservoirs 14, 20, 16 along with the length of the first and second channels 40, 42 extending in the respective supply and fill reservoirs 14, 16 minimizes and substantially eliminates air within the supply and metering reservoirs 14, 20 from entering the first and second channels 40, 42 and keeps the fluid 14 in the fill reservoir 16 from entering the third channel 22 until the fill reservoir 16 is substantially full. Keeping system air out of the first and second channels 40, 42 reduces foaming and agitation of the liquid 12 within the fill reservoir 16.

Referring to FIGS. 9 and 10, in one embodiment, the size, (e.g. cross sectional area, length and volume) of the first channel, 40, and the second channel, 42, are critical to the speed with which the fluid may be transferred. Restrictive flow through the first channel 40 and first cannula 44 may increase the time required for the fluid to stop flowing into the metering reservoir 20 from the supply reservoir 14. Restrictive flow through the second channel 42 and second cannula 46 may be desired to slow down the transfer from the metering reservoir 20 into the fill reservoir 16. In one embodiment, the user must hold the plunger rod 74 (FIG. 4) in the up or transfer position (FIG. 21) until the pressure between the metering reservoir 20 and the supply reservoir 14 is equalized. Releasing the plunger rod 74 prior to the pressure equalizing may result in the plunger rod 74 being pulled into the metering reservoir 20 prior to a full volume of fluid being transferred from the supply reservoir 14 to the metering reservoir 20. The force required to hold the plunger rod 74 in the up position may be proportional to the pressure differential between the supply reservoir 14 and the metering reservoir 20. In other embodiments, the user holds the plunger rod 74 in the up or transfer position until the metering reservoir 20 is substantially full and then the user depresses the plunger rod 74 without waiting for the pressure between the supply reservoir 14 and the metering reservoir 20 to equalize. Rapid flow of the fluid 12 into the metering reservoir 20, as the plunger rod 74 is being drawn up, will reduce the force and time required by the user. Restrictive flow of the fluid 12 from the metering reservoir 20, as the plunger rod 74 is being depressed, will help the user have control of the transfer of the fluid 12 from the metering reservoir into the fill reservoir 16. In one embodiment, the transfer of the fluid 12 from the metering reservoir into the fill reservoir 16 is done drop by drop or in a non-turbulent manner in order to ensure that any air in the system stays toward the top of the fill reservoir 16. In one embodiment, the total volume of the second channel 42 is larger than the total volume of the first channel 40 such that any air initially in the first and second channels 40, 42 remains in the metering reservoir and is not transferred into the fill reservoir 16.

In one embodiment, the second and third cannulas 46, 48 are as small as possible to prevent damage to the closure 16a of the fill reservoir 16 and to reduce or prevent fluid turbulence as described above while allowing sufficient air and fluid transfer from the fill reservoir 16 back into the supply reservoir 14. In one embodiment, the second and third cannulas 46, 48 are substantially similar in diameter. In one embodiment, the third cannula 48 has a diameter that is at least as large as or larger than the diameter of the second cannula 46. In one embodiment, the first cannula 44 has a larger cross sectional area than a cross sectional area of the second cannula 46. In one embodiment, the first cannula 44 is a 16 gauge needle. In one embodiment, the second and third cannulas 46, 48 are 29 gauge needles. In one embodiment, the first cannula 44 is an 8 gauge needle. In one embodiment, the first cannula 44 is the largest diameter needle that prevents or reduces coring of the vial septum 32 while keeping in mind that the larger the first channel 40 is the more air that is initially introduced into the system. Any air initially within the first channel 40 may be contained within the second channel 42 by making the second channel 42 larger than the first channel as discussed below. Using the largest diameter needle that prevents or reduces coring of the vial septum may allow for the maximum flow rate between the supply reservoir 14 and the metering reservoir 20 while allowing the supply reservoir 14 to continue functioning as a sealed container following removal of the supply reservoir 14 from the fluid transfer device 10. In one embodiment, the first cannula 44 is a 16 gauge needle and the supply reservoir is a 10 ml vial. In another embodiment, the first cannula 44 is configured (e.g. diameter and/or cross sectional area) to give the desired flow rate between the supply reservoir 14 and the metering reservoir 20 without a concern for the resealability of the vial septum 32 if the supply reservoir 14 is to be discarded after removal or the supply reservoir 14 is never removed from the fluid transfer device 10.

In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 10 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 9 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 8 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 7 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 6 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 5 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 4 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 3 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 2 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 1 second. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 0.5 seconds. In one embodiment, the first, second and third cannulas 44, 46, 48 and the first and second channels 40, 42 are configured (e.g. diameter, cross sectional area and/or length) such that fluid 12 is transferred from the supply reservoir 14 into the metering reservoir in less than 0.1 seconds. In one embodiment, the first, second and third cannulas 44, 46, 48 and the first and second channels 40, 42 are sized and configured (e.g. diameter, cross sectional area and/or length) such that fluid 12 is transferred from the supply reservoir 14 into the metering reservoir in less than 0.1 seconds.

In one embodiment, the distal tip 44a of the first cannula 44 includes a beveled tip for piercing the closure 32 of the supply reservoir 14. In one embodiment, the distal tip 46a of the second cannula 46 includes a beveled tip for piercing the septum 16a of the fill reservoir 16. In one embodiment, the second end 48b of the third cannula 48 includes a beveled tip for piercing the septum 16a of the fill reservoir 16. In one embodiment, the third cannula 48 extends along side of the second cannula 46. In an alternative embodiment, the third cannula 48 is positioned partially within the second cannula 46 (not shown). In one embodiment, the third cannula 48 partially extends through or within the first cannula 44. In one embodiment, the third cannula 48 is partially co-axial with the first cannula 44. In another embodiment, the first end 48a of the third cannula 48 is curved toward an inner side wall of the first cannula 44 proximate the distal end 44a of the first cannula 44 such that first end 48a of the third cannula 48 follows an entry path of the first cannula 44 through the septum 32 of the supply reservoir 14 and avoids piercing the septum 32 more than once (e.g. creating a ring shaped piercing). In one embodiment, the second cannula 46 extends from the manifold 38 further than the third cannula 48 extends from the manifold 38 such that transferred fluid 12 does not go directly from the second cannula 46 and into the third cannula 48 due to surface tension on the second cannula 46 and pressure differentials between the supply and fill reservoirs 14, 16 without first filling the fill reservoir 16.

In one embodiment, a ratio of an inner diameter of the first cannula 44 proximate the distal end 44a and an outer diameter of the third cannula 48 proximate the first end 48a is 250:1. In one embodiment, a ratio of an inner diameter of the first cannula 44 proximate the distal end 44a and an outer diameter of the third cannula 48 proximate the first end 48a is 200:1. In one embodiment, a ratio of an inner diameter of the first cannula 44 proximate the distal end 44a and an outer diameter of the third cannula 48 proximate the first end 48a is 150:1. In one embodiment, a ratio of an inner diameter of the first cannula 44 proximate the distal end 44a and an outer diameter of the third cannula 48 proximate the first end 48a is 100:1. In one embodiment, a ratio of an inner diameter of the first cannula 44 proximate the distal end 44a and an outer diameter of the third cannula 48 proximate the first end 48a is 50:1. In one embodiment, a ratio of an inner diameter of the first cannula 44 proximate the distal end 44a and an outer diameter of the third cannula 48 proximate the first end 48a is 25:1. In one embodiment, a ratio of an inner diameter of the first cannula 44 proximate the distal end 44a and an outer diameter of the third cannula 48 proximate the first end 48a is 20:1. In one embodiment, a ratio of an inner diameter of the first cannula 44 proximate the distal end 44a and an outer diameter of the third cannula 48 proximate the first end 48a is 150:1. In one embodiment, a ratio of an inner diameter of the first cannula 44 proximate the distal end 44a and an outer diameter of the third cannula 48 proximate the first end 48a is 10:1. In one embodiment, a ratio of an inner diameter of the first cannula 44 proximate the distal end 44a and an outer diameter of the third cannula 48 proximate the first end 48a is 5:1. In one embodiment, a ratio of an inner diameter of the first cannula 44 proximate the distal end 44a and an outer diameter of the third cannula 48 proximate the first end 48a is 2.5:1. In one embodiment, a ratio of an inner diameter of the first cannula 44 proximate the distal end 44a and an outer diameter of the third cannula 48 proximate the first end 48a is 2.4:1. In one embodiment, a ratio of an inner diameter of the first cannula 44 proximate the distal end 44a and an outer diameter of the third cannula 48 proximate the first end 48a is 2.3:1. In one embodiment, a ratio of an inner diameter of the first cannula 44 proximate the distal end 44a and an outer diameter of the third cannula 48 proximate the first end 48a is 2.2:1. In one embodiment, a ratio of an inner diameter of the first cannula 44 proximate the distal end 44a and an outer diameter of the third cannula 48 proximate the first end 48a is 2.1:1. In one embodiment, a ratio of an inner diameter of the first cannula 44 proximate the distal end 44a and an outer diameter of the third cannula 48 proximate the first end 48a is 2.0:1. In one embodiment, a ratio of an inner diameter of the first cannula 44 proximate the distal end 44a and an outer diameter of the third cannula 48 proximate the first end 48a is 1.9:1. In one embodiment, a ratio of an inner diameter of the first cannula 44 proximate the distal end 44a and an outer diameter of the third cannula 48 proximate the first end 48a is 1.8:1. In one embodiment, a ratio of an inner diameter of the first cannula 44 proximate the distal end 44a and an outer diameter of the third cannula 48 proximate the first end 48a is 1.7:1. In one embodiment, a ratio of an inner diameter of the first cannula 44 proximate the distal end 44a and an outer diameter of the third cannula 48 proximate the first end 48a is 1.6:1. In one embodiment, a ratio of an inner diameter of the first cannula 44 proximate the distal end 44a and an outer diameter of the third cannula 48 proximate the first end 48a is 1.5:1. In one embodiment, a ratio of an inner diameter of the first cannula 44 proximate the distal end 44a and an outer diameter of the third cannula 48 proximate the first end 48a is 1.4:1. In one embodiment, a ratio of an inner diameter of the first cannula 44 proximate the distal end 44a and an outer diameter of the third cannula 48 proximate the first end 48a is 1.3:1. In one embodiment, a ratio of an inner diameter of the first cannula 44 proximate the distal end 44a and an outer diameter of the third cannula 48 proximate the first end 48a is 1.2:1. In one embodiment, a ratio of an inner diameter of the first cannula 44 proximate the distal end 44a and an outer diameter of the third cannula 48 proximate the first end 48a is 1.1:1. The sizes and respective ratios of the first, second and third cannulas 44, 46, 48 may be varied depending on desired flow characteristics and the characteristics and orientation of the supply and fill reservoirs 14, 16.

In one embodiment, the first channel 40 includes a first check valve 50 to allow the fluid 12 to only flow through the first channel 40 in a single direction, i.e. from the supply reservoir 14 to the metering reservoir 20. The second channel 42 includes a second check valve 52 to allow the fluid 12 to only flow through the second channel 42 in a single direction, i.e. from the metering reservoir 20 to the fill reservoir 16. In the exemplary embodiment, the first and second check valves 50, 52 are umbrella valves. However, the first and second check valves 50, 52 may be any device or any orientation of the first and second channels 40, 42 that prevents fluid-flow in two directions such as duck-bill valves, cross-slit valves, floating ball valves, membranes or micropumps. In another alternative embodiment, the first and second channels 40, 42 may include more than one check valve 50, 52 to ensure fluid flow within each first and second channel 40, 42 is in a single direction. In an alternative embodiment, the first and second check valves 50, 52 may be combined into a single valve (not shown) such as a three way valve.

Figure 17:
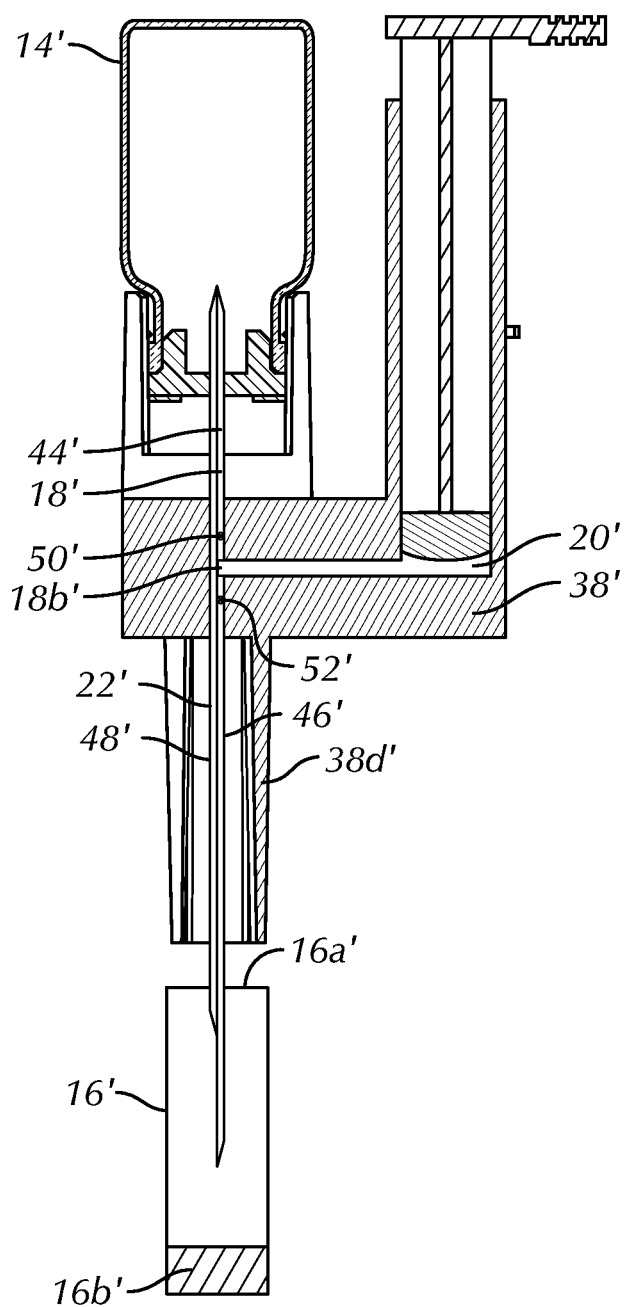
FIG. 17 is a front cross-sectional view of a fluid transfer device in accordance with another exemplary embodiment of the present invention.

Referring to FIG. 17, in another alternative embodiment, the first and second check valves 50', 52' are positioned in the first and second cannulas 44', 46' respectively. In one embodiment, the first and second cannulas 44', 46' are generally co-axial. In one embodiment, the first and second cannulas 44', 46' abut or conjoin with the third cannula 48' such that a single sealed entry point is created with the supply and fill reservoirs 14, 16. In an alternative embodiment, one or more valves (not shown) is positioned within the manifold 38' between the first and second cannulas 44' at a first flow path junction 18b' such that the fluid 12 is only permitted to flow from the supply reservoir 14 into the fill reservoir 16 in the first flow path 18. In yet another alternative embodiment, the first and second cannulas 44, 46 are formed by a single cannula (not shown) that contains a three-way valve (not shown) connected to the metering reservoir 20. In yet another alternative embodiment, the single cannula may contain one or more a micropump or MEMS (not shown) within the single cannula. In an alternative embodiment, the first and second channels 40, 42 do not include valves and the one-way flow within the first and second channels 40, 42 is controlled via the pressure differentials and/or the configuration of the first and second flow paths 18, 22 (not illustrated). In an alternative embodiment, one or more of the check valves 50', 52' are provided in either or both of the supply and fill reservoirs 14', 16' rather than in the first and/or second channels 40, 42.

Referring to FIGS. 5-8, in one embodiment, the manifold 38 at least partially defines the first and second channels 40, 42. In one embodiment, the second section 38b substantially forms the first and second channels 40, 42 extending between the first and second cannulas 44, 46 respectively. In one embodiment, the first and second check valves 50, 52 are attached to the second section 38b within the first and second channels 40, 42 respectively. In one embodiment, the first and third sections 38a, 38c sandwich the second section 38b and define the remainder of the first and second channels 40, 42. In one embodiment, the third cannula 48 is attached to the second section 38b. However, the third cannula 48 may be segmented such that the manifold defines a portion of the third channel 22.

Figure 6:
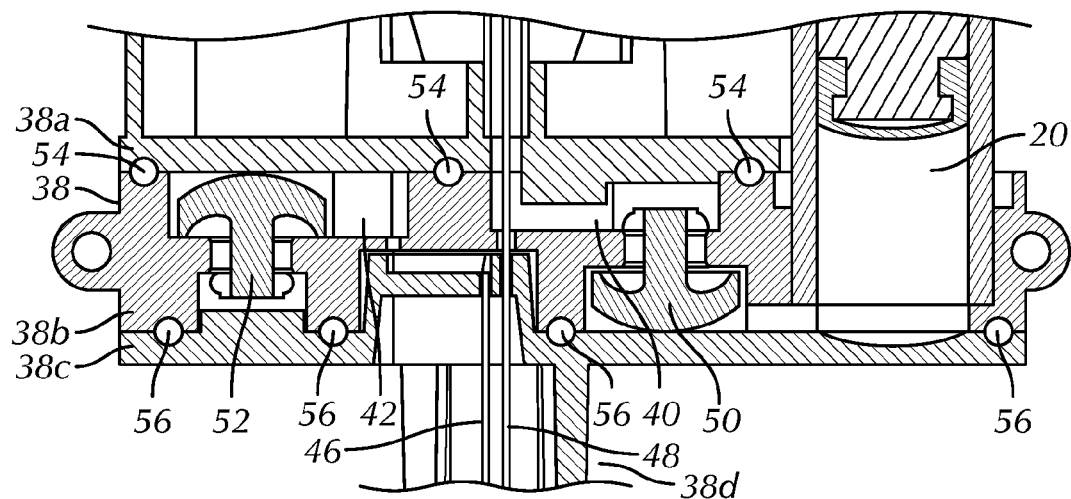
FIG. 6 is an enlarged view of a portion of the manifold shown in FIG. 5.
Figure 7:
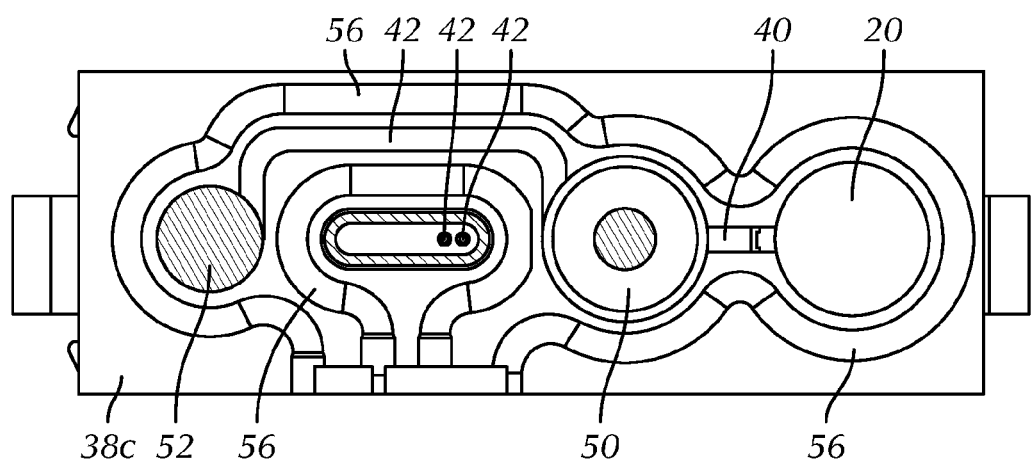
FIG. 7 is a bottom plan view of the manifold shown in FIG. 4.
Figure 8:
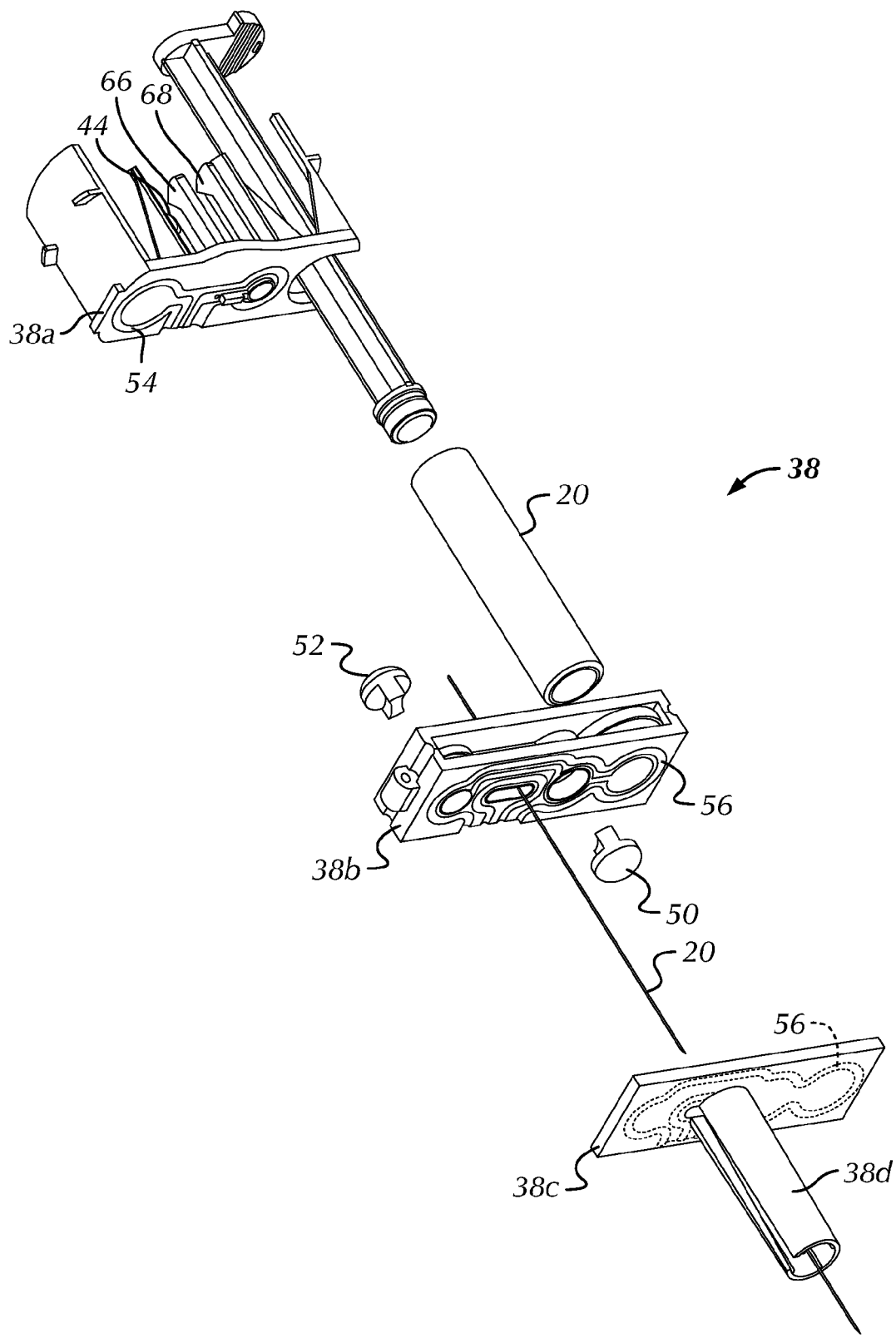
FIG. 8 is a front exploded perspective view of the manifold shown in FIG. 4.

Referring to FIGS. 6-8, the first and second sections 38a, 38b may define a first raceway 54 proximate an upper perimeter of the first and second channels 40, 42 and the second and third sections 38b, 38c may define a second raceway 56 proximate a lower perimeter of the first and second channels 40, 42. In one embodiment, the first and second raceways 54, 56 are filled with an adhesive (not visible) to attach the first and third sections 38a, 38c to the second section 38b and form a sealing gasket around the first and second channels 40, 42. In one embodiment, the adhesive is a UV curable adhesive such as a LOCTITE® product. In another embodiment, the adhesive is inserted into the first and second raceways 54, 56 after stacking the first, second and third sections 38a, 38b, 38c of the manifold 38. However, the first and second raceways 54, 56 may be filled with any adhesive or sealing substance before or after assembling the manifold 38 and the manifold may alternatively be held together by one or more mechanical fasteners such as a snap fit groove, spot weld and/or ultrasonic weld that does not require adhesive.

Figure 4:
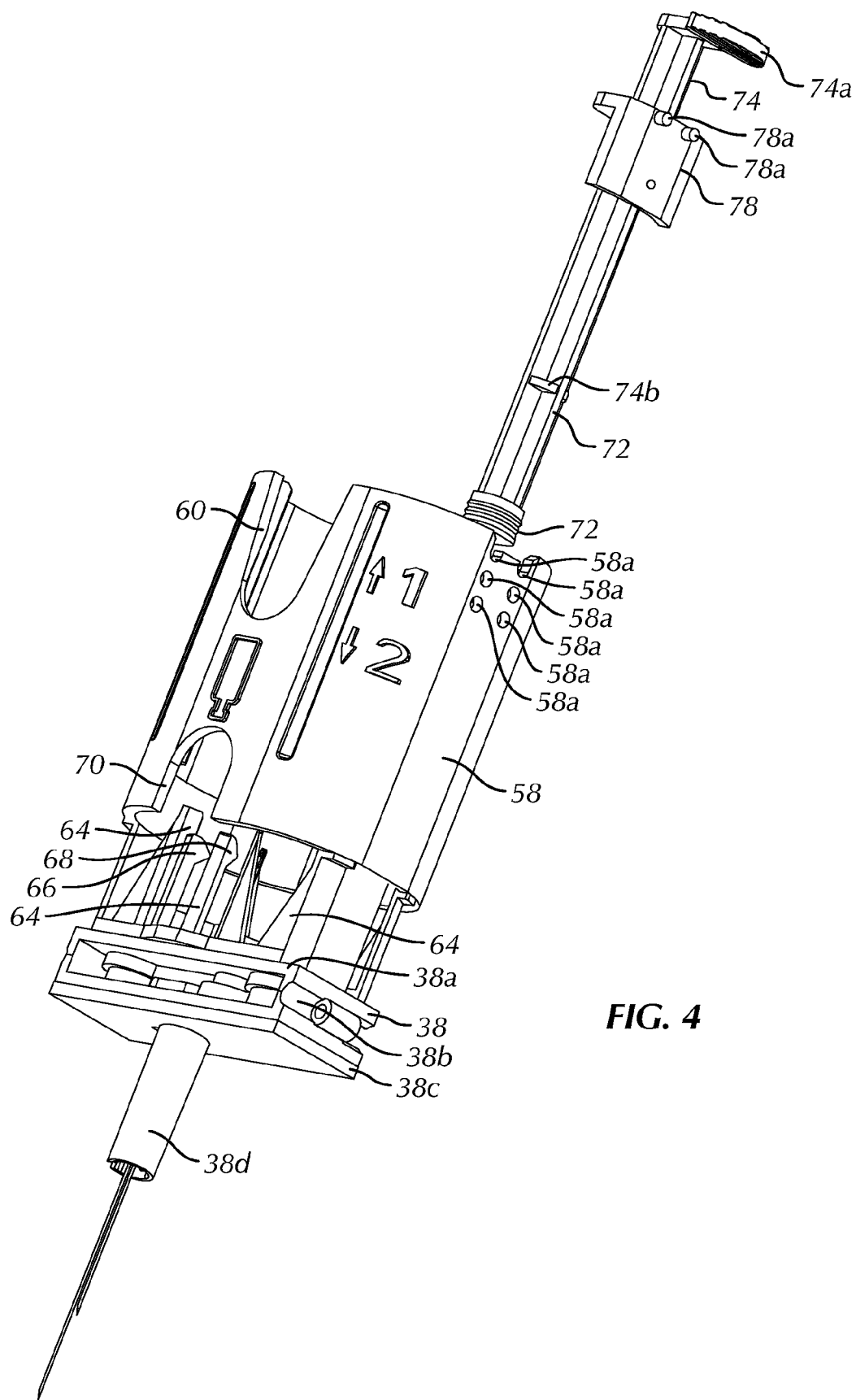
FIG. 4 is a partially exploded perspective view of a manifold and a supply support of the fluid transfer device of FIG. 3.

Referring to FIGS. 3-5, the fluid transfer device 10 includes a supply support 58 configured to accommodate the supply reservoir 14 proximate the first cannula 44. In one embodiment, the supply support 58 is rigidly attached to the first section 38a of the manifold 38. The supply support 58 may alternatively be integrally formed with the manifold 38. In one embodiment, the supply support 58 includes at least one opening 60 configured to allow a user to contact the vial body 36 of the supply reservoir 14. In one embodiment, the supply support 58 includes two laterally spaced openings 60 such that the supply reservoir 14 can be pinched between two fingers during insertion and removal of the supply reservoir 14. In one embodiment, the at least one opening 60 is configured to be generally tangent to the supply reservoir 14 to minimize the tendency to twist the supply reservoir 14 relative to the supply support 58. In one embodiment, the supply support 58 includes supply reservoir indicia 58b to indicate where and/or how to insert the supply reservoir 14. In one embodiment, the supply support 58 includes fill indicia 58c which illustrates the steps to perform in filling the supply reservoir 16.

Referring to FIG. 3, in a further embodiment, the supply support 58 includes an adapter 62. In one embodiment, the adapter 62 is optionally provided to accommodate and/or support differently sized supply reservoirs 14. In one embodiment, the adapter 62 is a sleeve that slides over and snap or compression fits onto the vial 28. In one embodiment, the adapter 62 includes arms 62b that snap or compression fit proximate or onto the neck 34. In one embodiment, the adapter 62 includes diametrically opposed projections 62a that slide into the openings 60 of the supply support 58 and prevent the adapter 62 from twisting relative to the supply support 58 and block a view of the fluid 12 through the supply support 58 and may aid in removing the adapter 62 from the supply support 58.

Figure 20:
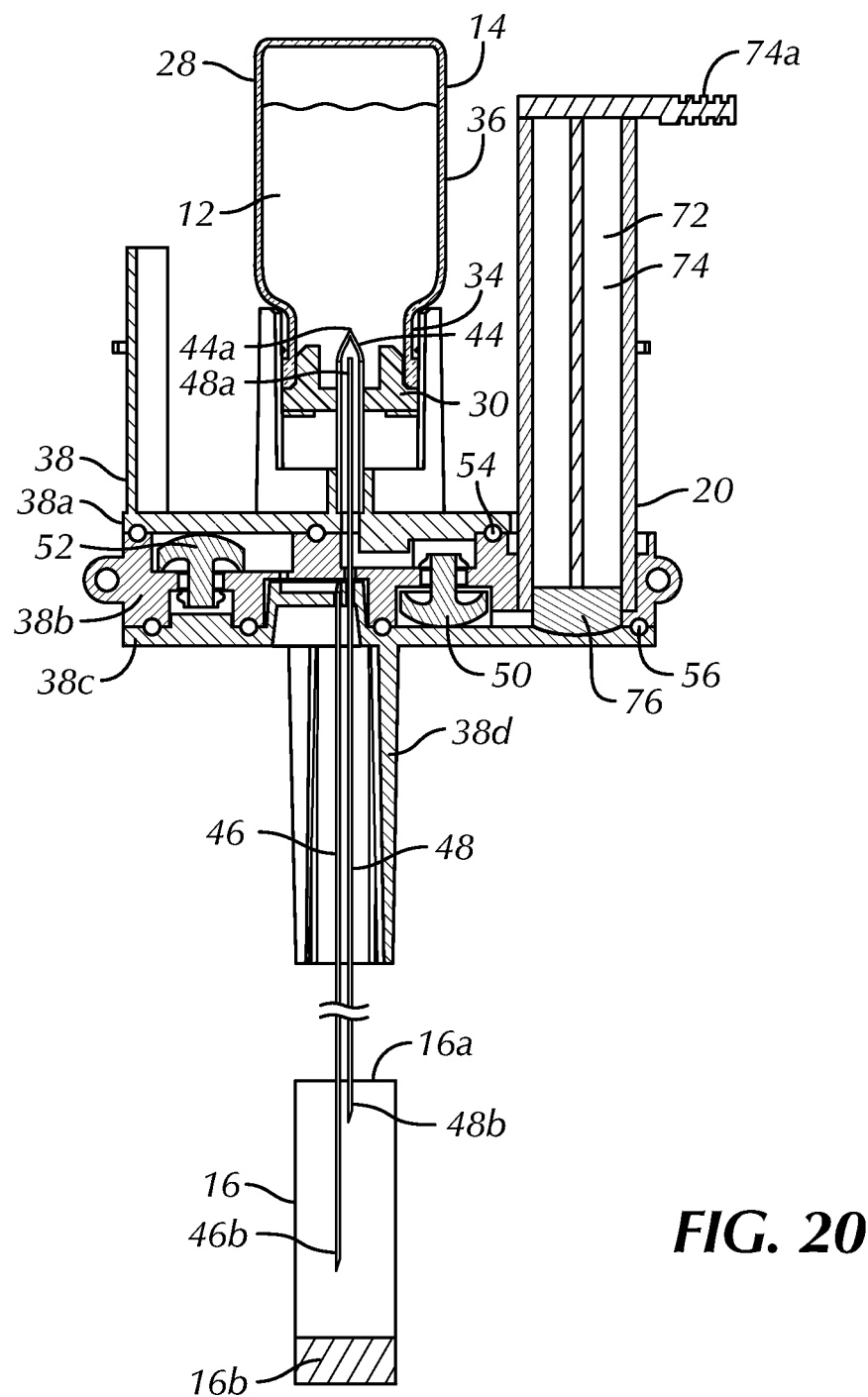
FIG. 20 is a partial cross sectional view of the fluid transfer device of FIG. 3 in the fill position.

Referring to FIGS. 4 and 9, the fluid transfer device 10 may include a plurality of projections 64 extending in the first direction and spaced around the first cannula 44. The projections 64 may slidingly engage with the closure 30 (see FIG. 3) when the supply reservoir 14 is inserted over the distal end 44a of the first cannula 44. In one embodiment, at least one of the projections 64 includes a first radially inwardly projecting catch 66 configured to releasably retain the supply reservoir 14 by extending over the closure 30 proximate the neck 34. In another embodiment, at least one of the projections includes a second radially inwardly projection catch 68 configured to releasably retain the supply reservoir 14 by extending over the closure 30 proximate the neck 34. In one embodiment, the first and second catches 66, 68 are spaced from the manifold 38 different distances such that different sized closures 30 may be accommodated. In one embodiment, the first section 38a of the manifold 38 may space the supply reservoir 14 a sufficient distance along the first cannula 44 such that the distal end 44a of the first cannula 44 extends entirely within the supply reservoir 14 in the fill position (FIG. 20). In one embodiment, the projections 64 are integrally formed with the manifold 38. Referring to FIG. 10, in another embodiment, at least one the catches 66', 68' are configured to fixedly retain the supply reservoir 14 such that the user cannot remove the supply reservoir 14 after use covering and protecting the first cannula 44.

Referring to FIG. 5, in one embodiment, the first cannula 44 pierces the closure 32 and extends into the supply reservoir 14 in the fill position. The inner diameter of the first cannula 44 is sufficiently sized and positioned such that once the fluid 12 is drained below the bevel of the first cannula 44, the vacuum within the first channel 40 is sufficient to overcome the surface tension resistance of the fluid 12 that exists between the fluid 12 and the inner surface of the supply reservoir 14 to substantially empty the supply reservoir 14 to maximize fluid transfer and prevent wasting the fluid 12. In one embodiment, the diameter and position of the first cannula 44 within the supply reservoir 14 is configured to extract at least 90 percent of the fluid 12 from the supply reservoir 14. In one embodiment, the diameter and position of the first cannula 44 within the supply reservoir 14 is configured to extract at least 91 percent of the fluid 12 from the supply reservoir 14. In one embodiment, the diameter and position of the first cannula 44 within the supply reservoir 14 is configured to extract at least 92 percent of the fluid 12 from the supply reservoir 14. In one embodiment, the diameter and position of the first cannula 44 within the supply reservoir 14 is configured to extract at least 93 percent of the fluid 12 from the supply reservoir 14. In one embodiment, the diameter and position of the first cannula 44 within the supply reservoir 14 is configured to extract at least 94 percent of the fluid 12 from the supply reservoir 14. In one embodiment, the diameter and position of the first cannula 44 within the supply reservoir 14 is configured to extract at least 95 percent of the fluid 12 from the supply reservoir 14. In one embodiment, the diameter and position of the first cannula 44 within the supply reservoir 14 is configured to extract at least 96 percent of the fluid 12 from the supply reservoir 14. In one embodiment, the diameter and position of the first cannula 44 within the supply reservoir 14 is configured to extract at least 97 percent of the fluid 12 from the supply reservoir 14. In one embodiment, the diameter and position of the first cannula 44 within the supply reservoir 14 is configured to extract at least 98 percent of the fluid 12 from the supply reservoir 14. In one embodiment, the diameter and position of the first cannula 44 within the supply reservoir 14 is configured to extract at least 98.5 percent of the fluid 12 from the supply reservoir 14. In one embodiment, the diameter and position of the first cannula 44 within the supply reservoir 14 is configured to extract at least 99 percent of the fluid 12 from the supply reservoir 14. In one embodiment, the diameter and position of the first cannula 44 within the supply reservoir 14 is configured to extract at least 99.5 percent of the fluid 12 from the supply reservoir 14. In one embodiment, the diameter and position of the first cannula 44 within the supply reservoir 14 is configured to extract at least 99.9 percent of the fluid 12 from the supply reservoir 14. In one embodiment, the diameter and position of the first cannula 44 within the supply reservoir 14 is configured to extract at least 99.99 percent of the fluid 12 from the supply reservoir 14. In one embodiment, the diameter and position of the first cannula 44 within the supply reservoir 14 is configured to extract at least 99.999 percent of the fluid 12 from the supply reservoir 14.

Referring to FIG. 4, in one embodiment, the supply support 58 includes at least one viewing window 70 such that the amount of fluid 12 remaining within the supply reservoir 14, or lack of fluid 12 within the supply reservoir 14, can be seen by the user. In one embodiment, the viewing window 70 at least partially exposes the neck 34 of the vial 28 such that the user can determine if the supply reservoir 14 is empty. In one embodiment, the empty supply reservoir 14 may be exchanged with a full supply reservoir 14 to continue filling the fill reservoir 16.

Figure 19:
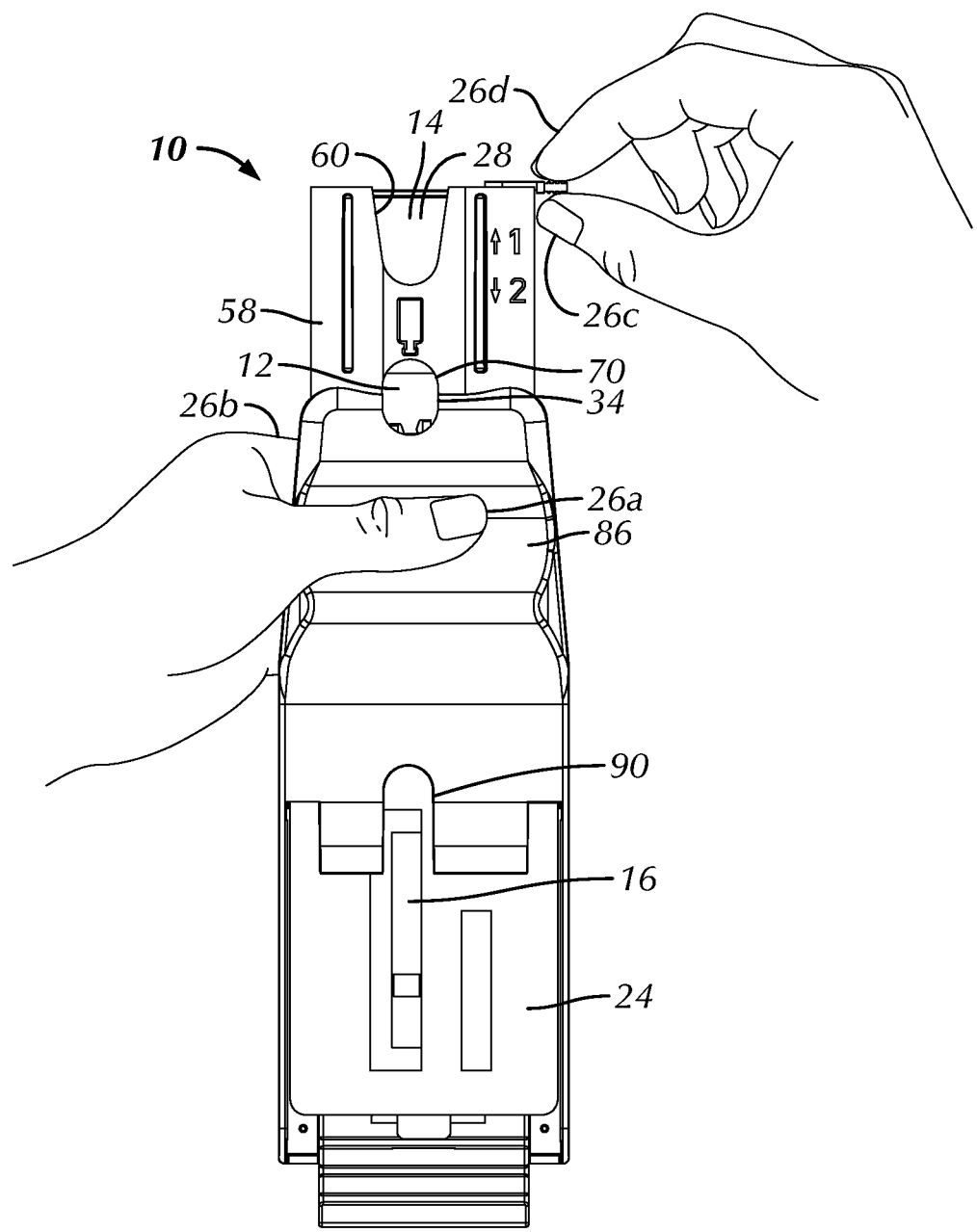
FIG. 19 is a front elevational view of the fluid transfer device of FIG. 3 in a fill position and being held by a user.

Referring to FIGS. 4 and 5, in one embodiment, the metering reservoir 20 includes a plunger 72. However, the metering reservoir 20 may be any device that is configured to exchange the fluid 12 within the system and/or impart a pressure differential. In one embodiment, the plunger 72 is manually operable and comprises a plunger rod 74 and a plunger tip 76. In one embodiment, the plunger tip 76 is constructed of an elastomeric material that seals the metering reservoir 20 from the ambient air. In one embodiment, the plunger rod 74 includes a tab 74a for a user to grip between a thumb 26c and an index finger 26d (FIG. 19). In alternative embodiments, the volume of the metering reservoir 20 is controlled by flexing the metering reservoir 20 (not illustrated). In alternative embodiment, the plunger 72 may be threadably connected to the metering reservoir 20 such that a twisting motion by the user controls the volume of the metering reservoir 20 (not illustrated). In another alternative embodiment, the volume of the metering reservoir 20 is controlled by a device such as a mechanically controlled piston activated by a push button, lever or wheel or an electro-mechanical actuating device (not shown).

In one embodiment, the supply support 58 includes a metering stop 78 that acts as a limit stop for the plunger 72. In one embodiment, the metering stop 78 is adjustable such that the predetermined volume of the metering reservoir 20 is adjustable. In one embodiment, the metering reservoir 20 has a maximum volume that is greater than the volume of the fill reservoir 16. In one embodiment, the supply reservoir 14 has a volume greater the maximum volume of the metering reservoir 20. In one embodiment, the maximum volume of the metering reservoir 20 is up to 50% greater than the volume of the fill reservoir 16. In one embodiment, the maximum volume of the metering reservoir 20 is up to 40% greater than the volume of the fill reservoir 16. In one embodiment, the maximum volume of the metering reservoir 20 is up to 30% greater than the volume of the fill reservoir 16. In one embodiment, the maximum volume of the metering reservoir 20 is up to 20% greater than the volume of the fill reservoir 16. In one embodiment, the maximum volume of the metering reservoir 20 is up to 10% greater than the volume of the fill reservoir 16. In one embodiment, the maximum volume of the metering reservoir 20 is up to 5% greater than the volume of the fill reservoir 16.

In one embodiment, the excess fluid 12 from the fill reservoir 16 delivered to the fill reservoir 16 is delivered back into the supply reservoir 14. In one embodiment, the predetermined volume of the metering reservoir 20 is adjusted depending on the volume of the fill reservoir 16, the size of the first and second channels 40, 42 and/or a factor of safety or redundancy to account for air transfer within the system such as may be caused by tilting the fluid transfer device 10 from vertical toward horizontal or any air pre-existing within the first and second channels 40, 42. In one embodiment, the metering stop 78 includes projections 78a that extend outwardly and are insertable into recesses 58a in the supply support 58. In one embodiment, the plunger rod 74 engages with the metering stop 78 at the limit position to prevent further drawing of the plunger 72. In one embodiment, the plunger rod 74 includes a projection 74b that contacts the metering stop 78 at the limit position. In an alternative embodiment, the excess fluid 12 from the fill reservoir 16 is not returned back into the supply reservoir 14 but is instead delivered to an overflow chamber (not shown) or permitted to freely drain from the system (not illustrated).

In one embodiment, the metering reservoir 20 includes an air valve (not shown) that allows for air within the metering reservoir 20 to be expelled from the metering reservoir 20 rather than sent through the second channel 42. In one embodiment, the air valve is a wettable membrane that allows air to pass through the air valve but not the fluid 12. In one embodiment, the air valve is positioned proximate the top of the metering reservoir 20 to purge any air within the system (e.g. air initially within the first channel 40) before the fluid drawn into the metering reservoir 20 contact the air valve.

Figure 12:
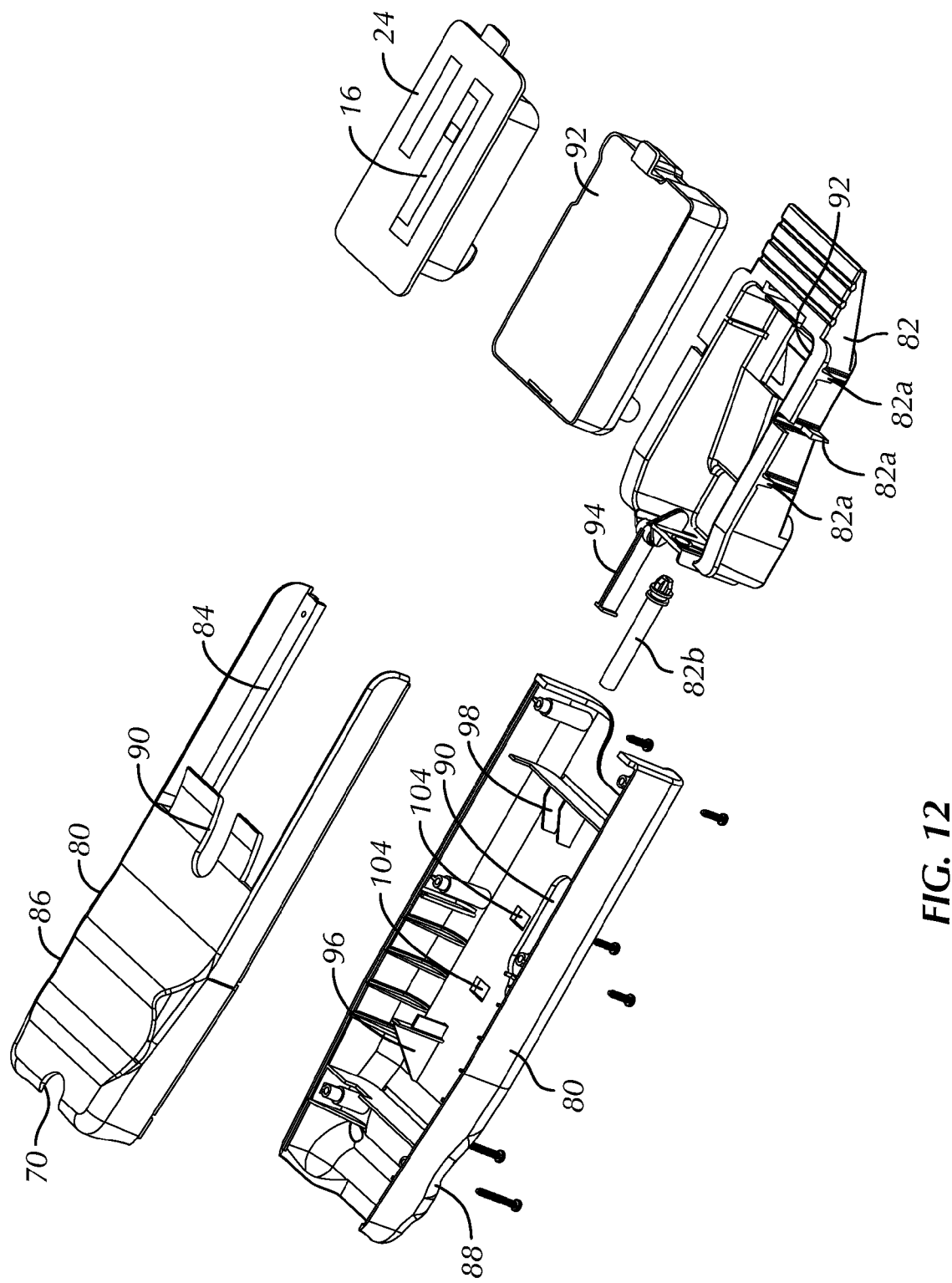
FIG. 12 is an exploded front perspective view of a tray and tray support of the fluid delivery device of FIG. 3.
Figure 13:
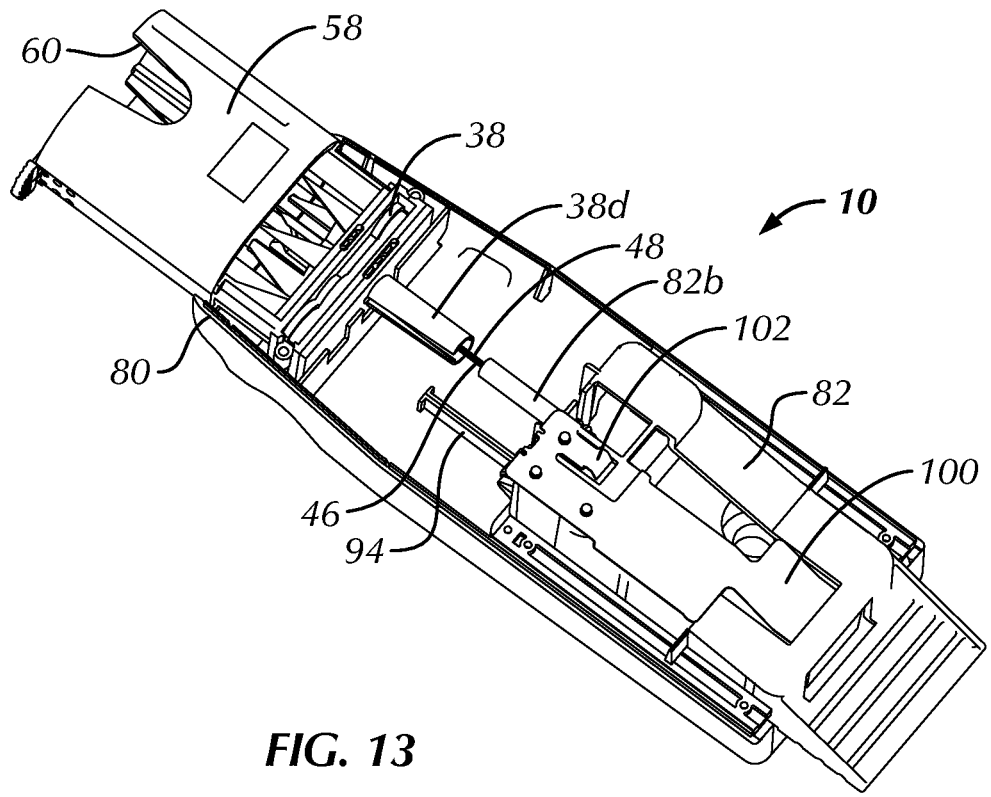
FIG. 13 is a rear perspective view of the fluid transfer device of FIG. 3 with a back half of the tray support removed.

Referring to FIGS. 12 and 13, in one embodiment, the fluid transfer device 10 includes a tray support 80 connected to the manifold 38 and that is configured to align the fill reservoir 16 with the second cannula 46. In one embodiment, a tray 82 is slideably connected to the tray support 80 and is configured to accommodate the fill reservoir 16 or a fluid delivery device 24 containing the fill reservoir 16. In one embodiment, the tray support 80 includes a pair of slide rails 84 (only one slide rail visible). In one embodiment, the tray 82 is slideably mounted to the slide rails 84 to allow positioning the tray 82 toward and away from the manifold 38. In one embodiment, the tray 82 includes a plurality of projections 82a that contact alternate sides of the rails 84 along the length of each rail 84. In one embodiment, the second and third cannulas 46, 48 extend into the tray 82.

Figure 14:
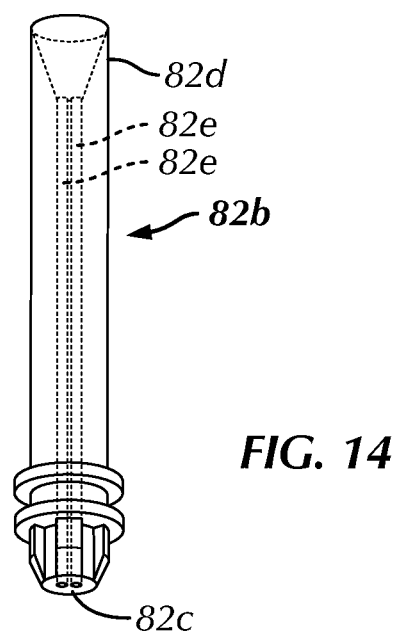
FIG. 14 is a perspective view of a needle shield of the fluid delivery device of FIG. 3.

Referring to FIGS. 12-14, in one embodiment, a cannula guide 82b captures the distal end 46a of the second cannula 46 and the second end 48b of the third cannulas 48b and directs the second and third cannulas 46, 48 into the tray 82 as the tray 82 is slid toward the manifold 38. The cannula guide 82b may also help to prevent damage to the second and third cannulas 46, 48 during assembly and use. In one embodiment, the cannula guide 82b is fixedly attached to the tray 82. In one embodiment, the cannula guide 82b is integral with the tray 82. In one embodiment, a sheath 38d extends downwardly from the manifold 38 at least partially surrounding the second and third cannulas 46, 48. The cannula guide 82b may overlap with the sheath 38d to allow for movement of the tray 82 relative to the manifold 38. In one embodiment, the cannula guide 82b is slideably coupled with sheath 38d. In one embodiment, the sheath 38d extends over the cannula guide 82b. In another embodiment, the cannula guide 82b extends over the sheath 38d (not shown). In one embodiment, the cannula guide 82b and the sheath 38d are generally cylindrical. In other embodiments, the cannula guide 82b and the sheath 38d have any suitable shape such as triangular or rectangular (not shown). In one embodiment, the sheath 38d includes a side opening for molding purposes.

Referring to FIG. 14, because the second and third cannulas 46, 48 are relatively thin needles in one embodiment, the cannula guide 82b may help reduce or prevent the second and third cannulas 46, 48 from bending caused by repeated insertion into septums 16a (FIG. 22) of the fill reservoirs 16. In one embodiment, the cannula guide 82b includes at least one non-pierceable tube 82e such that the ends of the second and third cannulas 46, 48 are not dulled by or pierce into the polymeric material of the cannula guide 82b as the tray 82 is moved. In one embodiment, the non-pierceable tubes 82e are comprised of metal. In one embodiment, the second and third cannulas 46, 48 remain at least partially within the cannula guide 82b after assembly in all positions of the tray 82. In one embodiment, a proximal end 82d tapers toward the entrance of the tubes 82e to help direct the second and third cannulas 46, 48 into the tubes 82e during assembly of the fluid transfer device 10. A distal end 82c of the cannula guide 82b may extend into the tray 82 for engagement with the fluid delivery device 24 (FIG. 12). In one embodiment, the distal end 82c of the cannula guide 82b is tapered (e.g. frustoconical shape) to help align the cannula guide 82b with the septum 16a of the fill reservoir 16 as the distal end 82c of the cannula guide 82b engages with a larger frustoconical recess (not shown) in the fluid delivery device 24 proximate the septum 16a of the fill reservoir 16. In one embodiment, the distal end 82c of the cannula guide 82b includes a plurality of axially extending and radially spaced projections.

With continued reference to FIGS. 12 and 13, in one embodiment, the tray 82 includes a safety lock 94 configured to prevent the tray 82 from moving relative to the tray support 80 when the tray 82 is empty. In an alternative embodiment, the safety lock 94 is positioned on the tray support 80. In one embodiment, the safety lock 94 prevents exposure of the first and third cannulas 46, 48 when the tray 82 is empty. In one embodiment, inserting the fluid delivery device 24 containing the fill reservoir 16 within the tray 82 releases the safety lock 94 and allows the tray 80 to move toward the manifold 38. In one embodiment, the safety lock 94 engages with a projection 96 within the tray support 80 in the locked position and pivoting the safety lock 94, by inserting the fluid delivery device 24 containing the fill reservoir 16 in the tray 82, pivots the safety lock 94 off of the projection 96 and unlocks the safety lock 94. In one embodiment, removing the fluid delivery device 24 containing the fill reservoir 16 from the tray 82 reengages the safety lock 94 with the projection 96. In one embodiment, the safety lock 94 is spring biased to the tray 82.

In one embodiment, the tray support 80 includes a ramp 98. In one embodiment, the ramp 98 engages with a biasing member 100 attached to the tray 82. In one embodiment, the biasing member 100 is a cantilever arm. In one embodiment, in the load/unload position (FIG. 19), the biasing member 100 contacts the ramp 98 and is urged upwardly through the tray 82 to lift the fluid delivery device 24 containing the fill reservoir 16, at least partially, from the tray 82 such that a user can grasp and remove the fluid delivery device 24 containing the fill reservoir 16 (not illustrated). In one embodiment, the biasing member 100 may be bent downwardly toward the tray support 80 when inserting the fluid delivery device 24 containing the fill reservoir 16. In one embodiment, the tray 82 is releasably engaged with the tray support 80 in the load/unload, initial and fill positions such that a resistance force is required to move the tray 82 from the initial and fill positions. In one embodiment, the tray 82 includes a release 102 that is releasably engaged with the tray support 80 and extends into recesses 104 in the tray support 80 in the load/unload, initial and fill positions. In one embodiment, the tray support 80 is curved outwardly proximate the viewing window 90 to accommodate the fluid delivery device 24 containing the fill reservoir 16 when the biasing member 100 pushes the fluid delivery device 24 containing the fill reservoir 16 from the tray 82 in the load/unload position.

Figure 15:
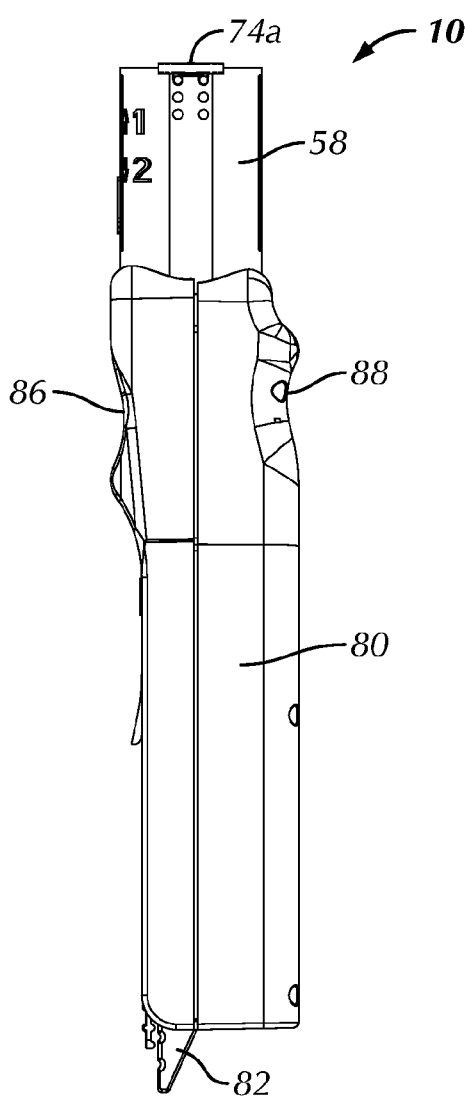
FIG. 15 is a side elevational view of the fluid transfer device of FIG. 3.
Figure 16:
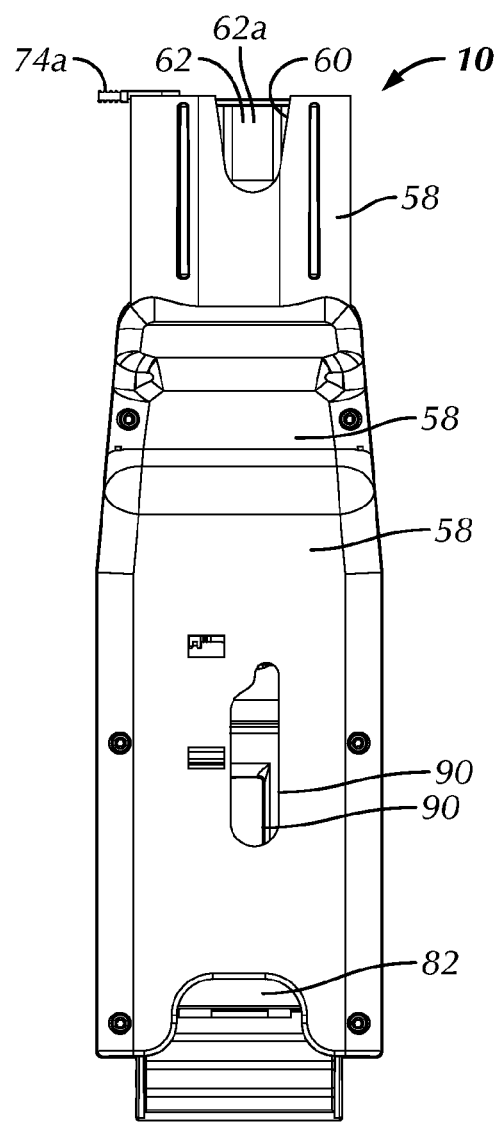
FIG. 16 is a rear elevational view of the fluid transfer device of FIG. 3.

Referring to FIGS. 15 and 19 the tray support 80 includes a first indent 86 configured to accommodate a first finger 26a of a user. In one embodiment, the first indent 86 extends laterally across the tray support 80. In an alternative embodiment, the first indent 86 is provided at an angle (not shown). The tray support 80 includes a second indent 88 configured to accommodate a second finger 26b of the user. In one embodiment, the first finger 26a is a thumb and the second finger 26b is an index finger such that when the fluid transfer device 10 is gripped by the user as shown in FIG. 19, the fill reservoir 16 is at least partially visible during filling of the fill reservoir 16. The viewing window 90 may be positioned on each side of the fill reservoir 20. In an alternative embodiment, a contrasting marking or background (not shown) may be provided on the interior of the tray support 80 such that the fluid 12 within the fill reservoir 16 is more easily seen through the viewing window 90.

Figure 18:
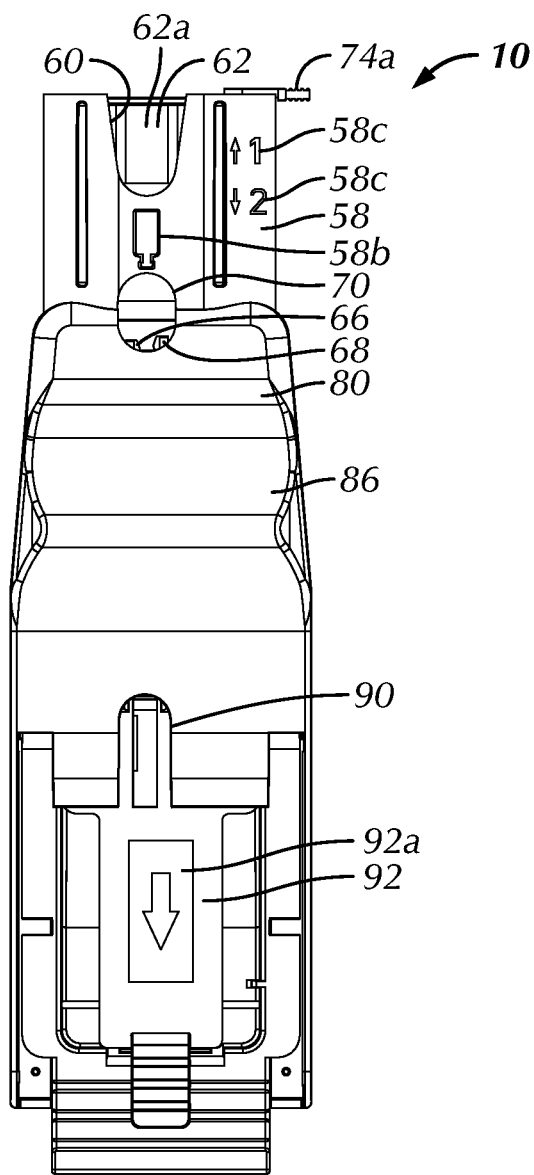
FIG. 18 is a front elevational view of the fluid transfer device of FIG. 3 in a storage or initial position.

Referring to FIG. 18, in one embodiment, a removable safety reservoir 92 comprising a penetrable body is configured to block access to the second and third cannulas 46, 48 and is provided in the tray 82 in the initial position. In one embodiment, the safety reservoir 92 includes indicia 92a that provides instructions to the user such as "remove before use" and "replace after use". In an alternative embodiment, the indicia 92a may include any information such as further instructions or product information (not shown).

Figure 21:
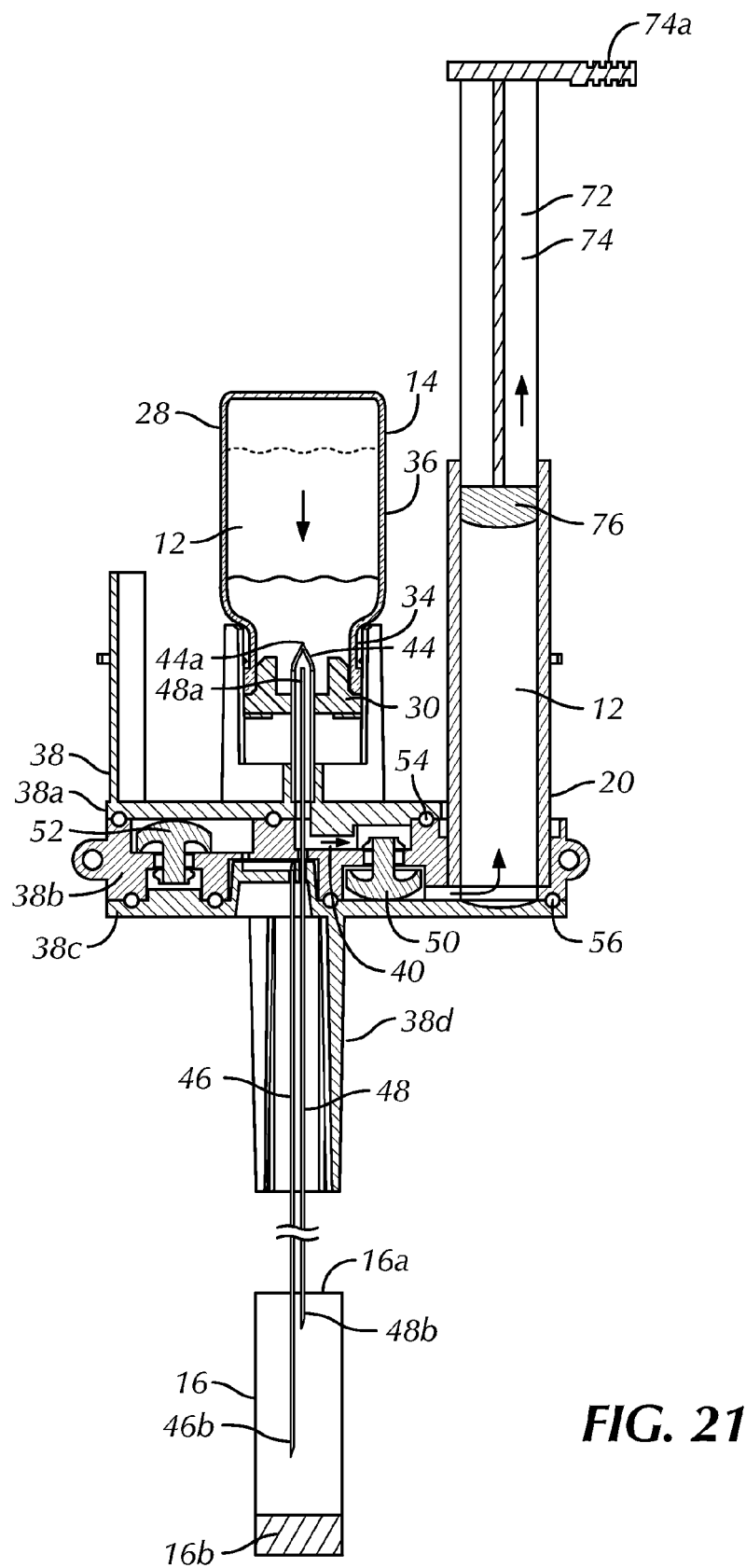
FIG. 21 is a partial cross sectional view of the fluid transfer device of FIG. 3 in a transfer position.
Figure 22:
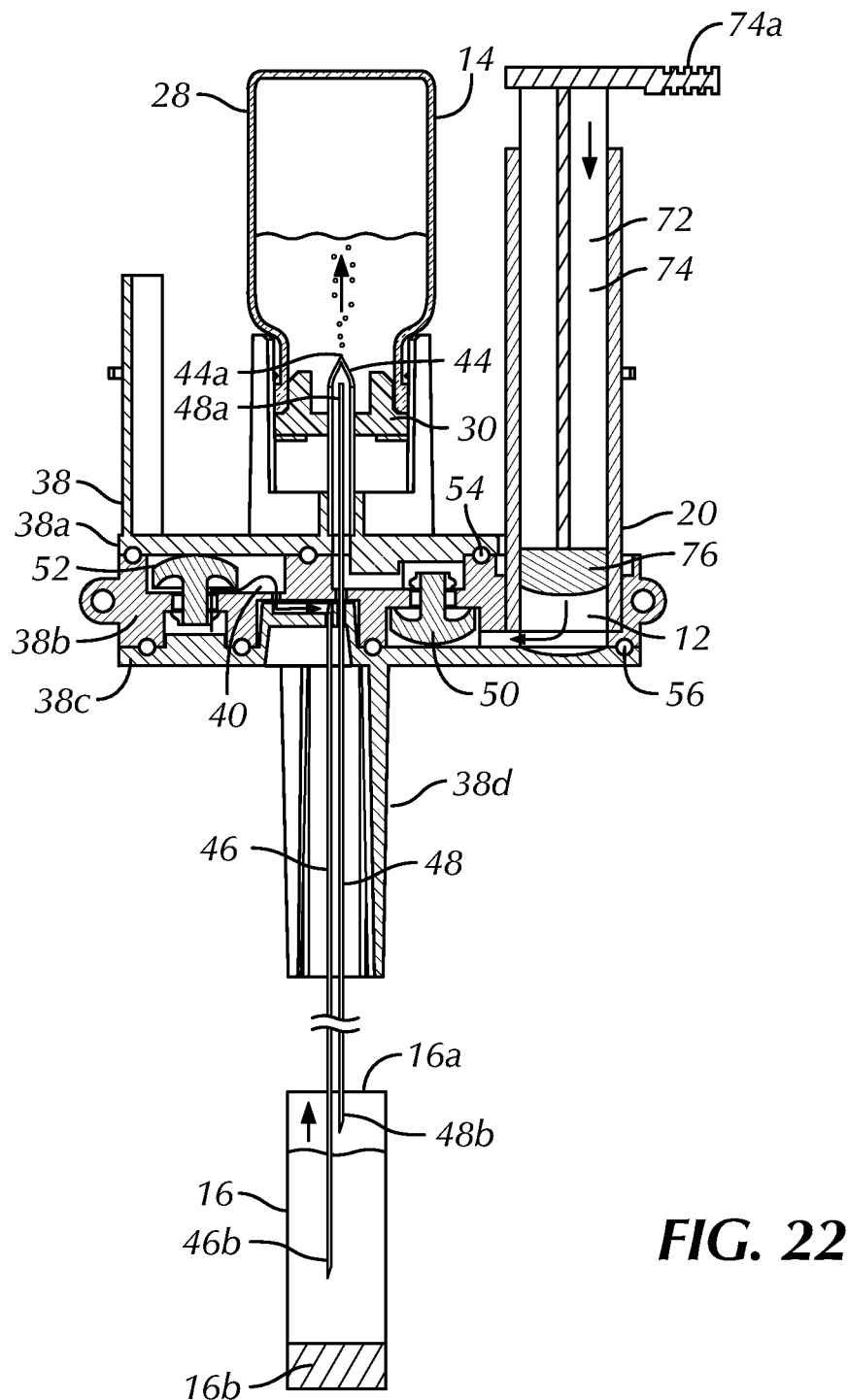
FIG. 22 is a partial cross sectional view of the fluid transfer device of FIG. 3 in a transferred position.

Referring to FIGS. 19-21, in one exemplary use, the safety reservoir 92 is removed from the tray 82 and the fluid delivery device 24 containing the fill reservoir is inserted into the tray 82. In one embodiment, the tray 82 is closed to sealingly insert the second and third cannula 46, 48 into the fill reservoir 16. In one embodiment, the supply reservoir 14 is inserted over the distal end 44a of the first cannula 44 such that the first cannula 44 and the third cannula 48 sealingly extend into the supply reservoir 14 and at least one of the first and second catches 66, 68 engages the supply reservoir 14. In one embodiment, the user grasps the tray support 80 with first and second fingers 26a, 26b and grasps the plunger tab 74a with first and second fingers 26c, 26d (FIG. 19). In one embodiment, the user pulls the plunger 72 to expand the metering reservoir 20 creating a negative pressure with respect to the pressure in the supply reservoir 14 drawing fluid 12 from the supply reservoir 14 through the first channel 40 and into the metering reservoir 20 (FIG. 21). In one embodiment, the user depresses the plunger 72 or pulls the plunger 72 downwardly to contract the metering reservoir 20 to expel liquid 12 through the second channel 42 and into the fill reservoir 16 (FIG. 22).

In one embodiment, the air within the fill reservoir 16 is compressed by the fluid 12 entering the fill reservoir 16 and travels through the third channel 22 (FIG. 2) to equalize with the pressure within the supply reservoir 14 (FIG. 2). In one embodiment, once the fill reservoir 16 is filled or the fluid 12 in the fill reservoir 16 reaches the second end 48b of the third channel 22, any additional liquid 12 delivered to the fill reservoir 16 is returned to the supply reservoir 14 via the third channel 22. In one embodiment, if the supply reservoir 14 is emptied prior to filling the fill reservoir 16, the supply reservoir 14 is exchanged with another supply reservoir 14 and is used to continue filling the fill reservoir 16. In one embodiment, once the fill reservoir 16 is filled, the tray 82 is pulled away from the manifold 38 to extract the second and third cannulas 46, 48 from the fill reservoir 16 and the fluid delivery device 24 containing the fill reservoir 16 is removed from the tray 82 and used in its intended application.

In one embodiment, the fluid transfer device 10 and the various components described above are comprised of materials that are compatible with the fluid 12. In one embodiment, the fluid transfer device 10 is comprised of medical-grade materials. In one embodiment, the manifold 38, the plunger tip 76 and the check valves 50, 52 are comprised of one or more medical-grade polymers. In one embodiment, the first, second and third cannulas 44, 46, 48 are comprised of stainless steel.

Figure 24A:
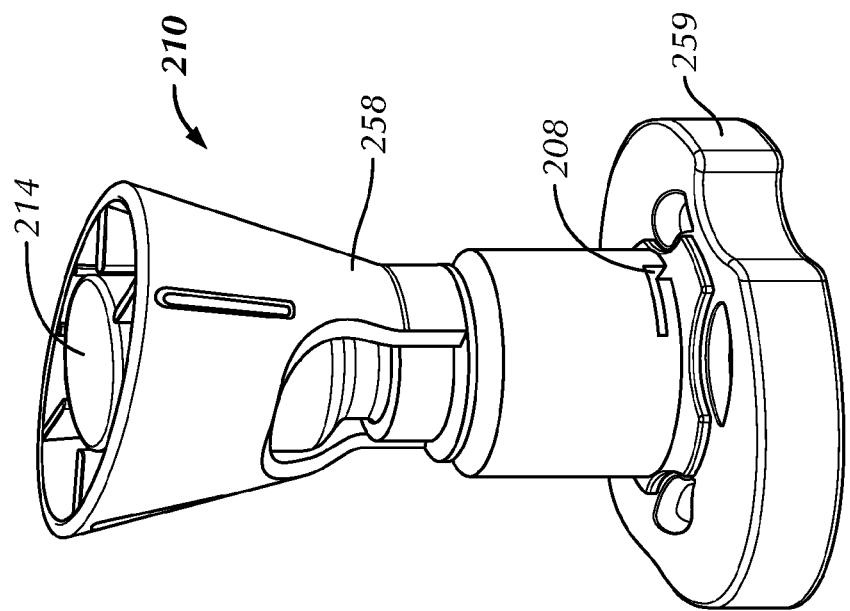
FIGS. 24A-24C are perspective views of a fluid transfer device in accordance with another exemplary embodiment of the present invention in the initial, transfer and transferred positions, respectively.
Figure 23:
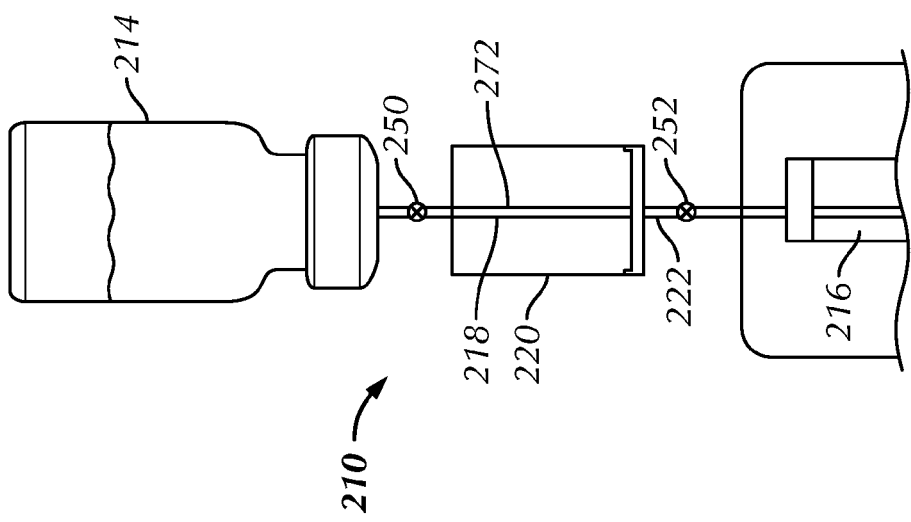
FIG. 23 is a schematic view of a fluid transfer device in accordance with another exemplary embodiment of the present invention in an initial position.
Figure 24C:
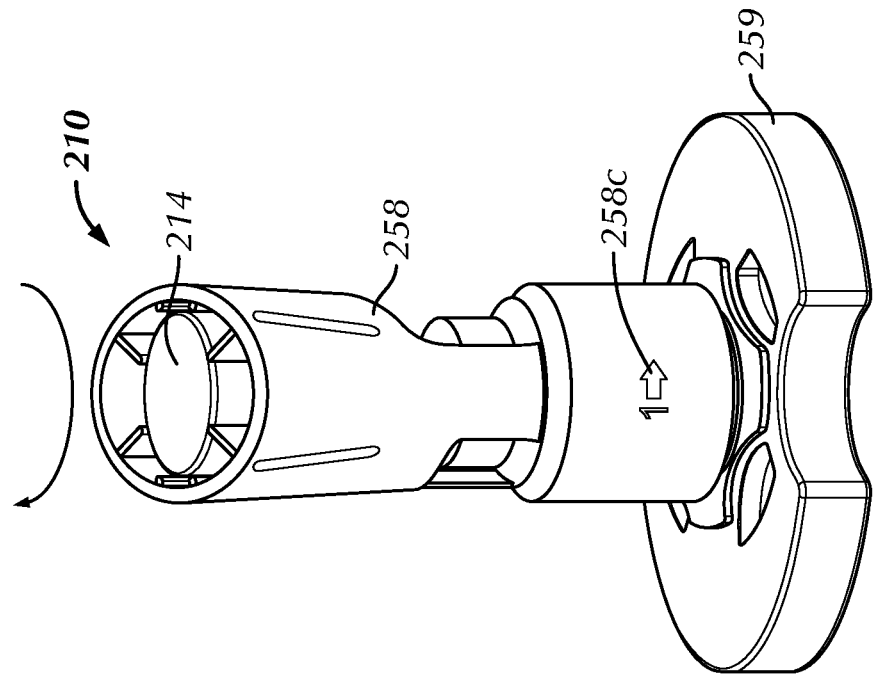
Figure 24B:
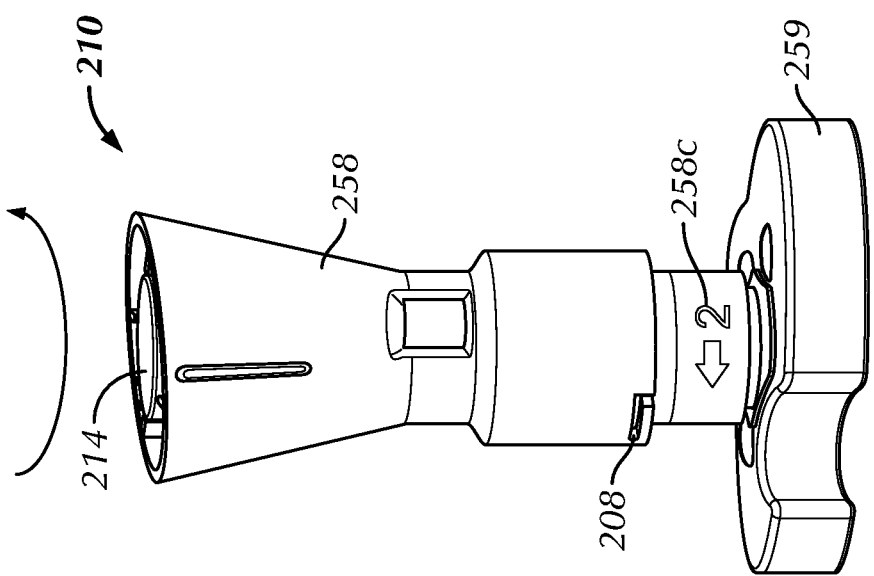

Referring to FIGS. 23-24C, there is shown another exemplary embodiment of a fluid transfer device, generally designated 210. In one embodiment, the supply and fill reservoirs 214, 216 are moved relative to one another to create the pressure differential between the supply and fill reservoirs 214, 216. In one embodiment, the metering reservoir 220 is positioned between the supply and fill reservoirs 214, 216. In one embodiment, the fluid transfer device 210 includes an upper support 258 coupled to the supply reservoir 214 and a lower support 259 coupled to the fill reservoir 216. In one embodiment, the metering reservoir 220 is comprised of a portion of the upper support 258 and a portion of the lower support 259. In one embodiment, the upper support 258 includes a plunger 272 and the lower support 259 includes a body of the metering reservoir 220. In one embodiment, the first fluid flow path 218 extends through the metering reservoir 220. In one embodiment the second fluid flow path 222 is flexible and/or extendable to accommodate the change in distance between the initial position (FIG. 24A) to the transfer position (FIG. 24B) and back to the transferred position (FIG. 24C). In one embodiment, the upper support 258 partially overlaps the lower support 259 in the initial and transferred positions. In one embodiment, first and second valves 250, 252 are provided within the first fluid flow path 218 on opposite sides of the metering reservoir 220 such that fluid only flow from the supply reservoir 214 to the fill reservoir 216. In an alternative embodiment, the first and second valves 250, 252 are provided within the supply and fill reservoirs 214, 216 respectively (not illustrated).

In one embodiment, pulling the upper support 258 and the supply reservoir 214 away from the lower support 259 and the fill reservoir 216 expands the volume of the metering reservoir 220 and draws fluid 12 from the supply reservoir 214 into the metering reservoir 220. In one embodiment, pushing the upper support 258 and the supply reservoir 214 toward the lower support 259 and the fill reservoir 216 contracts the volume of the metering reservoir 220 and forces the fluid 12 from the metering reservoir 220 into the fill reservoir 216. In such an embodiment, the first and second valves 250, 252 are configured to permit the one-way fluid flow through the first fluid flow path 218. In one embodiment, the upper support 258 and the lower support 259 include a corresponding thread (not visible) positioned between the upper support 258 and the lower support 259 and are configured to twist the upper support 258 relative to the lower support 259 to move the upper support axially toward and away from the lower support 259. In one embodiment, the thread or threads have a sufficient pitch and angle to allow the user to rotate upper support 258 relative to the lower support 259 less than a full rotation, e.g. ¾ rotation, ½ rotation, ¼ rotation, and a sufficient vertical or axial separation. In one embodiment, a limit indicator 208 is provided between the upper and lower supports 258, 259 and is configured to provide at least one of an audible and tactile feedback to the user to indicate when the metering reservoir 220 is full and when the metering reservoir 220 has been emptied. In one embodiment, first and second indicia 258c are provided on the upper and lower supports 258, 259 to indicate which direction to twist the upper support 258. In one embodiment, at least part of the indicia 258c is provided between the upper and lower supports 258, 259 such that the required motion is only visible when applicable.

In another embodiment, the upper and lower supports 258, 259 are moved relative to one another with a push/pull motion, rather than a twisting motion, to create the pressure differential between the supply and fill reservoirs 314, 316.

It will be appreciated by those skilled in the art that changes could be made to the exemplary embodiment shown and described above without departing from the broad inventive concept thereof. It is understood, therefore, that this invention is not limited to the exemplary embodiment shown and described, but it is intended to cover modifications within the spirit and scope of the present invention as defined by the claims. Specific features of the exemplary embodiments may or may not be part of the claimed invention and combinations of disclosed embodiments may be combined. Unless specifically set forth herein, the terms "a", "an" and "the" are not limited to one element but instead should be read as meaning "at least one".

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A fluid transfer device for transferring fluid between a supply reservoir and a fill reservoir comprising:
    a metering reservoir;
    a first flow path having a first one-way channel fluidly connected with the metering reservoir and configured to fluidly couple the supply reservoir and the metering reservoir and a second one-way channel fluidly connected with the metering reservoir and configured to fluidly couple the fill reservoir and the metering reservoir;
    a second flow path configured to fluidly couple the supply reservoir and the fill reservoir;
    a member supporting the first and second one-way channels;
    a tray support connected to the member and configured to align the fill reservoir with the second one-way channel; and
    a tray slideably connected to the tray support and configured to accommodate the fill reservoir.

2. The fluid transfer device of claim 1, wherein the first one-way channel includes a first cannula and the second one-way channel includes a second cannula.

3. The fluid transfer device of claim 2, wherein the first cannula includes a beveled tip.

4. The fluid transfer device of claim 3, wherein the second cannula includes a beveled tip.

5. The fluid transfer device of claim 2, wherein the first cannula extends in a first direction from the member and the second cannula extends in a second direction from the member, the first direction being generally opposite the second direction.

6. The fluid transfer device of claim 5, wherein the metering reservoir extends from the member generally in the first direction.

7. The fluid transfer device of claim 2 further comprising: a manifold that supports the first and second cannulas, the manifold forming at least part of the first one-way channel and at least part of the second one-way channel.

8. The fluid transfer device of claim 2, wherein the first cannula has a larger cross sectional area than a cross sectional area of the second cannula.

9. The fluid transfer device of claim 1, further comprising:
a supply support configured to couple the fluid transfer device with the supply reservoir.

10. The fluid transfer device of claim 9, wherein the supply support includes at least one catch proximate the first channel and configured to releasably retain the supply reservoir.

11. The fluid transfer device of claim 10, wherein the at least one catch includes at least two catches spaced different distances from the first channel.

12. The fluid transfer device of claim 9, wherein the supply support includes at least one catch proximate the first channel and configured to non-releasably retain the supply reservoir.

13. The fluid transfer device of claim 9, wherein the supply support is configured to position the first one-way channel within the supply reservoir and the first one-way channel is configured to transfer substantially all of the fluid from the supply reservoir.

14. The fluid transfer device of claim 1, wherein at least one of the tray support and the tray further comprises a safety lock configured to prevent the tray from moving relative to the member when the tray is empty and exposing the second one-way channel.

15. The fluid transfer device of claim 1, further comprising: a safety reservoir configured to removeably couple with the tray configured to block access to the second one-way channel in an initial position.

16. The fluid transfer device of claim 1, wherein the first one-way channel includes a first cannula, the second one-way channel includes a second cannula and the second flow path includes a third cannula.

17. The fluid transfer device of claim 16, wherein the third cannula is disposed within the first cannula and a first end of the third cannula is curved toward an inner side wall of the first cannula proximate a distal end of the first cannula.

18. The fluid transfer device of claim 16, wherein a second end of the third cannula comprises a beveled tip.

19. A fluid transfer device for transferring fluid between a supply reservoir and a fill reservoir comprising:
a metering reservoir;
a first flow path having a first one-way channel fluidly connected with the metering reservoir and configured to fluidly couple the supply reservoir and the metering reservoir and a second one-way channel fluidly connected with the metering reservoir and configured to fluidly couple the fill reservoir and the metering reservoir; and
a second flow path configured to fluidly couple the supply reservoir and the fill reservoir,
wherein the first one-way channel includes a first cannula, the second one-way channel includes a second cannula and the second flow path includes a third cannula, and
wherein the third cannula is disposed within the first cannula and a first end of the third cannula is curved toward an inner side wall of the first cannula proximate a distal end of the first cannula.

\* \* \* \* \*